US012265711B1

(12) United States Patent
Pandey et al.

(10) Patent No.: US 12,265,711 B1
(45) Date of Patent: Apr. 1, 2025

(54) MECHANISM TO ENHANCE ENDURANCE IN UNIVERSAL FLASH STORAGE DEVICES

(71) Applicant: QUALCOMM Incorporated, San Diego, CA (US)

(72) Inventors: Ashwini Pandey, Muzaffarpur (IN); Pratibind Kumar Jha, Hyderabad (IN); Manish Garg, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/412,776

(22) Filed: Jan. 15, 2024

(51) Int. Cl.
*G06F 3/06* (2006.01)

(52) U.S. Cl.
CPC .......... *G06F 3/0616* (2013.01); *G06F 3/0629* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 11,307,931 B1* | 4/2022 | Bert | ...................... | G06F 11/073 |
| 2016/0019137 A1* | 1/2016 | Ellis | ...................... | G11C 16/10 |
| | | | | 711/103 |
| 2016/0231954 A1* | 8/2016 | Lin | ...................... | G11C 11/5642 |
| 2018/0011648 A1* | 1/2018 | Lin | ...................... | G06F 3/0655 |
| 2021/0149797 A1* | 5/2021 | Kanno | ................ | G06F 13/4068 |
| 2022/0075722 A1* | 3/2022 | Liang | .................... | G06F 12/0253 |
| 2022/0300372 A1* | 9/2022 | Bert | ...................... | G06F 3/0619 |
| 2022/0300376 A1* | 9/2022 | Bert | ...................... | G06F 11/10 |
| 2022/0300377 A1* | 9/2022 | Bert | ...................... | G06F 11/327 |
| 2023/0152995 A1* | 5/2023 | Doni | ...................... | G06F 3/0659 |
| | | | | 711/154 |

\* cited by examiner

*Primary Examiner* — Kevin Verbrugge
(74) *Attorney, Agent, or Firm* — Muncy, Geissler, Olds & Lowe, P.C./QUALCOMM

(57) ABSTRACT

Methods that may be performed by a universal flash storage (UFS) device of a computing device for configuring flash memory cells. Various embodiments may include setting a number of degraded triple-level cells (TLCs) attribute, and configuring at least one degraded TLC as at least one single-level cell (SLC) based on the number of degraded TLCs attribute, the at least one degraded TLC being not functional as a TLC and functional as an SLC. Some embodiments may include identifying the at least one degraded TLC based on at least one degradation attribute associated with the at least one degraded TLC, the at least one degradation attribute configured to indicate that the at least one degraded TLC is not functional as a TLC, and identifying an amount of degraded TLCs that are not functional as a TLC.

20 Claims, 12 Drawing Sheets

MECHANISM TO ENHANCE ENDURANCE IN UNIVERSAL FLASH STORAGE DEVICES

BACKGROUND

Components of universal flash storage (UFS) devices have limited lifespans. The components, including single-level cells and triple-level cells, wear with repeated use and with enough wear become non-functional for their intended purposes. Non-functional components can no longer be used as intended, which reduces the capabilities and negatively affects the operation of UFS devices.

SUMMARY

Various aspects include methods performed by a universal flash storage (UFS) device of a computing device for configuring flash memory cells. Various aspects may include setting a number of degraded triple-level cells (TLCs) attribute, and configuring at least one degraded triple-level cell (TLC) as at least one single-level cell (SLC) based on the number of degraded TLCs attribute, the at least one degraded TLC being not functional as a TLC and functional as an SLC.

Some aspects may further include identifying the at least one degraded TLC based on at least one degradation attribute associated with the at least one degraded TLC, in which the at least one degradation attribute is configured to indicate to the UFS device that the at least one degraded TLC is not functional as a TLC, and identifying an amount of degraded TLCs that are not functional as a TLC, in which setting the number of degraded TLCs attribute may include setting the number of degraded TLCs attribute based on the amount of degraded TLCs.

In some aspects, configuring the at least one degraded TLC as the at least one SLC based on the number of degraded TLCs attribute may include configuring a plurality of degraded TLCs, including the at least one degraded TLC, up to a value of the number of degraded TLCs attribute as single-level cells (SLCs), including the at least one SLC, each of the plurality of degraded TLCs being not functional as a TLC and functional as an SLC.

In some aspects, configuring the at least one degraded TLC as the at least one SLC based on the number of degraded TLCs attribute may include configuring a plurality of degraded TLCs, including the at least one degraded TLC, as SLCs, including the at least one SLC, each of the plurality of degraded TLCs being not functional as a TLC and functional as an SLC. Some aspects may further include configuring a plurality of SLCs, equal in number to the plurality of degraded TLCs, as TLCs.

In some aspects, configuring the at least one degraded TLC as the at least one SLC based on the number of degraded TLCs attribute may include configuring a plurality of degraded TLCs, including the at least one degraded TLC, as SLCs, including the at least one SLC, the plurality of degraded TLCs being equal in number to a plurality of degraded SLCs, each of the plurality of degraded TLCs being not functional as a TLC and functional as an SLC, and each of the plurality of degraded SLCs being not functional.

In some aspects, the at least one SLC is part of a writebooster buffer. Such aspects may further include assigning the writebooster buffer to a logical unit having a degradation value less than a logical unit degradation threshold.

In some aspects, the at least one SLC is part of a writebooster buffer. Such aspects may further include assigning the writebooster buffer having at least one degraded flash memory cell configured as a single-level cell to at least one undegraded logical unit, in which the degraded flash memory cell is identified as degraded based on the number of degraded TLCs attribute, the degraded flash memory cell being not functional as a TLC and functional as an SLC, and the undegraded logical unit having a degradation value less than a logical unit degradation threshold.

Some aspects may further include providing the number of degraded TLCs attribute from a UFS controller to a host controller, and receiving an instruction to configure degraded TLCs as SLCs from the host controller at the UFS controller.

Further aspects include a computing device including a UFS device having a UFS device controller, in which the UFS device controller is configured to perform operations of any of the methods summarized above. Further aspects include a UFS device including means for performing functions of any of the methods summarized above. Further aspects include a UFS device controller for use in a computing device, the UFS device controller including a processor configured to perform operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given and the detailed description, serve to explain the features herein.

DETAILED DESCRIPTION

Figure 1:
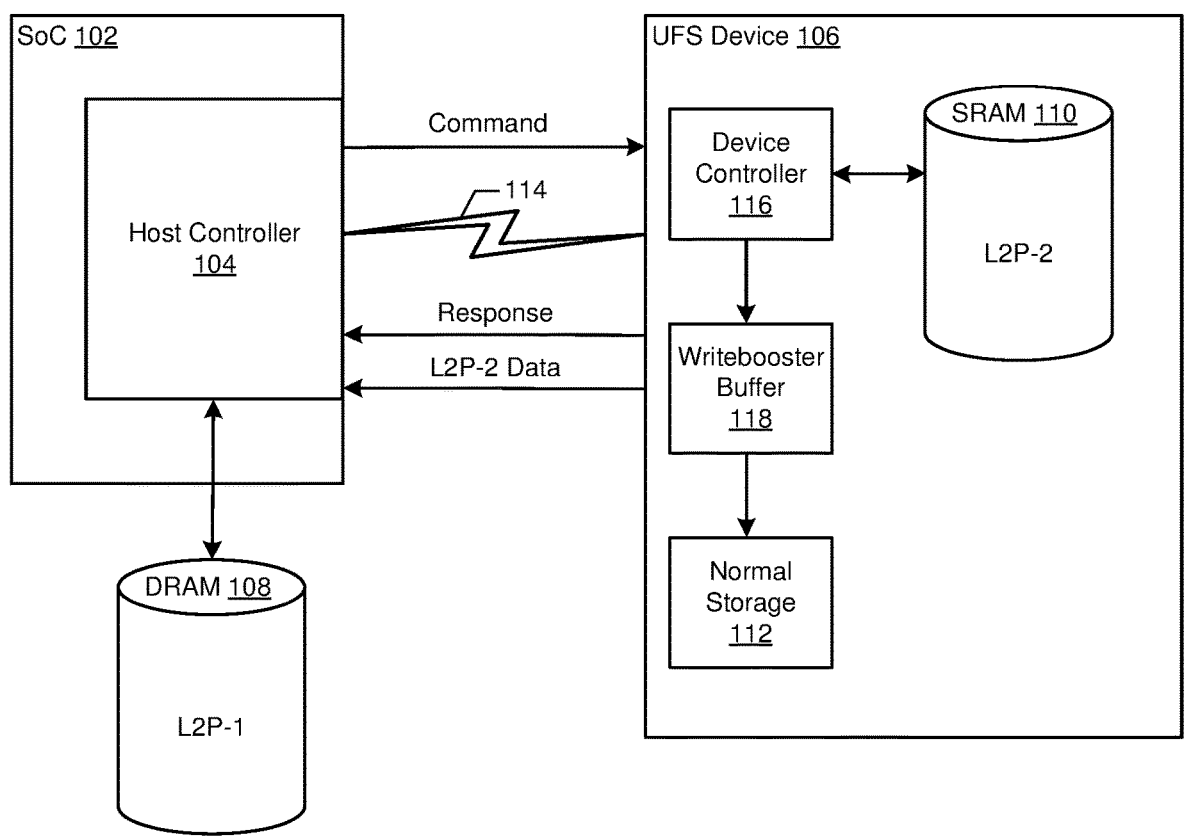
FIG. 1 is a system block diagram illustrating an example memory system suitable for implementing any of the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods and computing devices for implementing the methods for configuring flash memory cells, which may include setting an amount of degraded triple-level cells (TLCs) attribute configured to indicate to a universal flash storage (UFS) device an amount of triple-level cells not functional as triple-level cells and functional as single-level cells (SLC). Some embodiments may include configuring at least one degraded triple-level cell as at least one single-level cell based on the amount of degraded triple-level cells attribute, the at least one degraded triple-level cell being not functional as a triple-level cell and functional as a single-level cell.

The term "system-on-a-chip" (SoC) is used herein to refer to a single integrated circuit (IC) chip that contains multiple resources and/or processors integrated on a single substrate. A single SoC may contain circuitry for digital, analog, mixed-signal, and radio-frequency functions. A single SoC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SoCs may also include software for controlling the integrated resources and processors, as well as for controlling peripheral devices.

The term "system-in-a-package" (SIP) may be used herein to refer to a single module or package that contains multiple resources, computational units, cores and/or processors on two or more IC chips, substrates, or SoCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SoCs coupled together via high-speed communication circuitry and packaged in close proximity, such as on a single motherboard or in a single computing device. The proximity of the SoCs facilitates high speed communications and the sharing of memory and resources.

Components of UFS devices have limited lifespans. The components, including single-level cells and triple-level cells, wear with repeated use and with enough wear become non-functional for their intended purposes. Non-functional components can no longer be used as intended, which reduces the capabilities and negatively affects the operation of the UFS devices.

For example, triple-level cells have a lower endurance than single-level cells. Each has a program/erase cycle number threshold for which the flash memory cells may be functional for their intended purpose. Single-level cells have a greater program/erase cycle number threshold than triple-level cells for which the flash memory cells are be expected to be functional for their intended purpose. As an accumulated number of program/erase cycles progress toward the program/erase cycle number threshold for a flash memory cell, the flash memory cell becomes increasingly damaged and leaks an increasing amount of electrons. When a triple-level cell exceeds its program/erase cycle number threshold the triple-level cell is assumed to no longer be able to function as a triple-level cell. Triple-level cells are used to form the non-volatile memory of UFS devices. Failing triple-level cells reduce the memory capacity of the UFS devices.

Various embodiments address and overcome the foregoing problems with UFS devices by providing a mechanism to enhance endurance in UFS devices. Such a mechanism may include an amount of degraded triple-level cells attribute that may indicate to a UFS device a number of triple-level cells not functional as triple-level cells and functional as single-level cells. Embodiments may include setting the amount of degraded triple-level cells attribute and configuring at least one degraded triple-level cell as at least one single-level cell based on the amount of degraded triple-level cells attribute, the at least one degraded triple-level cell being not functional as a triple-level cell and functional as a single-level cell. The triple-level cells configured as single-level cells may be assigned for use as part of one or more writebooster buffers of the UFS devices. A number of single-level cells may be configured as triple-level cells to replace the degraded triple-level cells in the non-volatile memory of UFS devices.

Configuration of degraded triple-level cells as single-level cells maintains the capacity of one or more writebooster buffers of the UFS devices. Configuration of single-level cells as triple-level cells maintains the capacity of non-volatile memory of UFS devices. The amount of degraded triple-level cells attribute enables the UFS device to accurately identify the amounts of triple-level cells that may be configured as single-level cells. The amount of degraded triple-level cells attribute may also enable the UFS device to accurately identify the corresponding number of single-level cells that may be configured as triple-level cells to replace the degraded triple-level cells. Accurately identify the amounts of triple-level cells that may be configured as single-level cells and/or the corresponding amount of single-level cells that may be configured as triple-level cells may: increase utilization of the flash memory cells throughout the life of the UFS device; reduce negative impact on capacity and operation of writebooster buffers when the non-volatile memory is degraded; reduce negative impact on capacity and operation of writebooster buffers when a writebooster buffer is degraded; reduce negative impact on capacity and operation of the non-volatile when the non-volatile memory is degraded; and/or reduce negative impact on throughput of the UFS device when a writebooster buffer and/or the non-volatile memory is degraded.

FIG. 1 is a system block diagram illustrating an example system suitable for implementing any of the various embodiments. The system 100 may include one or more computing devices or processors for using and/or managing UFS devices. For example, the system 100 may include an SoC 102 including a host controller 104, a dynamic random-access memory (DRAM) 108 communicably connected to the host controller 104, and a UFS device 106 communicably connected to the host controller 104 via a link 114. The host controller 104 may include a processor (not shown separately) configured to perform operations of the host controller described herein. The host controller 104 may maintain and access stored L2P mapped entries (i.e., data) of an L2P-1 address mapping table. In some embodiments, the L2P mapped entries of the L2P-1 address mapping table may be stored at the DRAM 108 or an SRAM (not shown) integral to the SoC 102, and/or the host controller 104. The UFS device 106 may include a device controller 116, a static random-access memory (SRAM) 110, a writebooster buffer (e.g., single-level cell NAND memory) 118, and a normal storage (e.g., triple-level cell NAND memory) 112. The device controller 116 may be coupled to the SRAM 110 and the normal storage 112, such that the device controller 116 may interface L2P mapped entries (i.e., data) of an L2P-2 address mapping table between the normal storage 112 and the SRAM 110. The writebooster buffer 118 may be coupled with the device controller 116 and the normal storage 112, such that the writebooster buffers data written from the device controller 116 to the normal storage 112.

The host controller 104 may implement write transactions to the UFS device 106. The write transactions may include the host controller 104 issuing write commands from other components of the SoC 102 and/or from components communicably connected to the SoC 102 (e.g., via I/O of the SoC) to the device controller 116. The write transactions may also include data out UPIUs transferring the write data from the host controller to the device controller 116.

The device controller 116 receiving the write commands and data out UPIUs from the host controller 104 may write the data of the data out UPIUs to the writebooster buffer 118. The device controller 116 may manage the writebooster buffer 118 storing the data, including controlling flushing the data from the writebooster buffer 118 to the normal storage 112. The device controller 116 may implement flushing the data from the writebooster buffer 118 to the normal storage 112 periodically, episodically, etc. The device controller 116 may update the L2P-2 address mapping table at the UFS device 106 with addresses at the normal storage 112 for the flushed data.

The data of the L2P-2 address mapping table at the UFS device 106 may be used by the host controller 104 to update the L2P-1 address mapping table. Updating the L2P-1 address mapping table with the data of the L2P-2 address mapping table may synchronize the data of the L2P-1 address mapping table and the L2P-2 address mapping table. For example, the host controller 104 may update addresses at the writebooster buffer for data of the write transactions at the L2P-1 address mapping table with address at the normal storage 112 from the L2P-2 address mapping table.

The host controller 104 may implement read transactions at the UFS device 106. The read transactions may include the host controller 104 issuing read requests from other components of the SoC 102 and/or from components communicably connected to the SoC 102 (e.g., via I/O of the SoC) to the device controller 116. The read transactions may also include data in UPIUs transferring the read addresses from the host controller to the device controller 116. The read addresses may be physical addresses from the L2P-1 address mapping table corresponding to logical addresses received by the host controller 104 from the other components of the SoC 102 and/or from components communicably connected to the SoC. The read transactions may be subsequent to write transactions, and the L2P-1 address mapping table may be synchronized with the L2P-2 address mapping table enabling the host controller 104 to locate at the L2P-1 address mapping table the addresses of the read data at the normal storage 112. In other words, the synchronized L2P-1 address mapping table and L2P-2 address mapping table enable cache hits for the read data, avoiding cache misses.

The normal storage 112 may be configured with various logical units and the writebooster buffer 118 may be a shared writebooster buffer 118 for multiple logical units and/or multiple dedicated writebooster buffers 118 for individual logical units, as described further herein. The device controller 116 may be configured to control configuration of the normal storage 112 and the writebooster buffer 118. For example, the device controller 116 may control partitioning and/or allocating memory spaces at the normal storage 112, mapping of addresses for the normal storage 112 and the writebooster buffer 118, assignment of one or more writebooster buffers 118 to one or more normal storages 112 (e.g., logical units of the normal storage 112), etc. As another example, the device controller 116 may control assignment of flash memory cells (e.g., single-level cells and/or triple-level cells; not shown) to the normal storage 112 and the writebooster buffer 118. The device controller 116 may control settings of single-level cell and/or triple-level cell modes for the memory cells. Memory cells associated with an active single-level cell mode and/or inactive triple-level cell mode set by the device controller 116 may be configured as single-level cells for the writebooster buffer 118. Memory cells associated with an inactive single-level cell mode and/or active triple-level cell mode set by the device controller 116 may be configured as triple-level cells for the normal storage 112.

Figure 2:
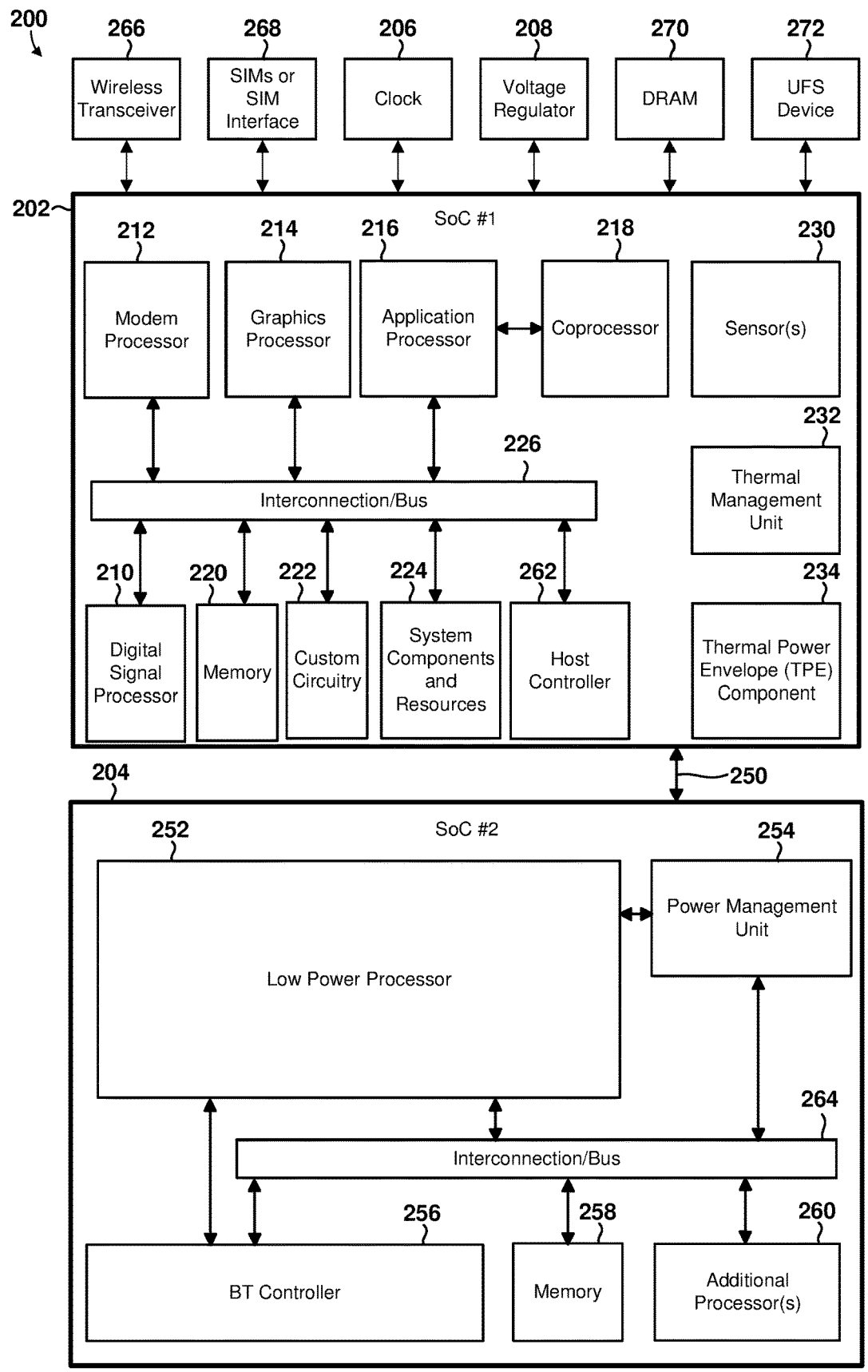
FIG. 2 is a component block diagram illustrating an example computing device suitable for implementing any of the various embodiments.

FIG. 2 is a component block diagram illustrating an example computing device 200 suitable for implementing any of the various embodiments. Various embodiments may be implemented on a number of single processor and multiprocessor computer systems, including a system-on-chip (SoC) or system in a package.

With reference to FIGS. 1 and 2, the illustrated example computing device 200 (which may be a system-in-a-package in some embodiments) includes a two SoCs 202, 204 (e.g., SoC 102) coupled to a clock 206, a voltage regulator 208, at least one subscriber identity module (SIM) 268 and/or a SIM interface, a DRAM 270 (e.g., DRAM 108) having a stored L2P address mapping table (e.g., L2P-1), a UFS device 272 (e.g., UFS device 106) having one or more writebooster buffers (e.g., writebooster buffer 118, single-level cell NAND memory) and normal storage (e.g., normal storage 112, triple-level cell NAND memory), a wireless transceiver 266 configured to send and receive wireless communications via an antenna (not shown) to/from wireless computing devices, such as a base station, wireless device, and/or computing device (e.g., system 100). In some embodiments, the first SoC 202 may operate as central processing unit (CPU) of the computing device 200 that carries out the instructions of software application programs by performing the arithmetic, logical, control and input/output (I/O) operations specified by the instructions. In some embodiments, the second SoC 204 may operate as a specialized processing unit. For example, the second SoC 204 may operate as a specialized 5G processing unit responsible for managing high volume, high speed (e.g., 5 Gbps, etc.), and/or very high frequency short wavelength (e.g., 28 GHz mmWave spectrum, etc.) communications.

The first SoC 202 may include a digital signal processor (DSP) 210, a modem processor 212, a graphics processor 214, an application processor (AP) 216, one or more coprocessors 218 (e.g., vector co-processor) connected to one or more of the processors, memory 220, custom circuitry 222, system components and resources 224, a host controller 262

(e.g., host controller 104), an interconnection/bus module 226, one or more sensors 230 (e.g., accelerometer, temperature sensor, pressure sensor, optical sensor, infrared sensor, analog sound sensor, etc.), a thermal management unit 232, and a thermal power envelope (TPE) component 234. The second SoC 204 may include a low power processor 252, a power management unit 254, an interconnection/bus module 264, a BT controller 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SoC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SoC 202, 204 may include various system components, resources, and custom circuitry for managing sensor data, analog-to-digital conversions, wireless data transmissions, and for performing other specialized operations, such as decoding data packets and processing encoded audio and video signals for rendering in a web browser or audio/video application. For example, the system components and resources 224 of the first SoC 202 may include power amplifiers, voltage regulators, oscillators, phase-locked loops, peripheral bridges, data controllers, memory controllers, system controllers, access ports, timers, and other similar components used to support the processors and software clients running on a computing device. The system components and resources 224 and/or custom circuitry 222 may also include circuitry to interface with peripheral devices, such as cameras, electronic displays, wireless communication devices, external memory chips, etc.

The first and second SoC 202, 204 may communicate via interconnection/bus module 250. In some embodiments, the interconnection/bus module may be a connection established by transceiving (i.e., receiving and transmitting) components within both the SoC 202 and SoC 204. For example, the low power processor 252 may include a universal asynchronous receiver-transmitter (UART) and the application processor 216 may include a multiple signal messages (MSM) UART driver that is communicatively connected to the UART of the low power processor 252.

The various processors 210, 212, 214, 216, 218, may be interconnected to one or more memory elements 220, system components and resources 224, and custom circuitry 222, and a thermal management unit 232 via an interconnection/bus module 226. Similarly, the low power processor 252 may be interconnected to the power management unit 254, the BT controller 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SoCs 202, 204 may further include an input/output module (not illustrated) for communicating with resources external to the SoC, such as a clock 206, a voltage regulator 208, one or more wireless transceivers 266, and at least one SIM 268 and/or SIM interface (i.e., an interface for receiving one or more SIM cards). Resources external to the SoC (e.g., clock 206, voltage regulator 208) may be shared by two or more of the internal SoC processors/cores. The at least one SIM 268 (or one or more SIM cards coupled to one or more SIM interfaces) may store information supporting multiple subscriptions, including a first 5GNR subscription and a second 5GNR subscription, etc.

In addition to the example computing device 200 discussed above, various embodiments may be implemented in a wide variety of computing systems, which may include a single processor, multiple processors, multicore processors, or any combination thereof. In some embodiments, the various processors of the SoC 202 and SoC 204 may be located within the same SoC. For example, the application processor 216 and low power processor 252 may be located within the same SoC, such as in a single SoC of a wearable device.

Figure 3:
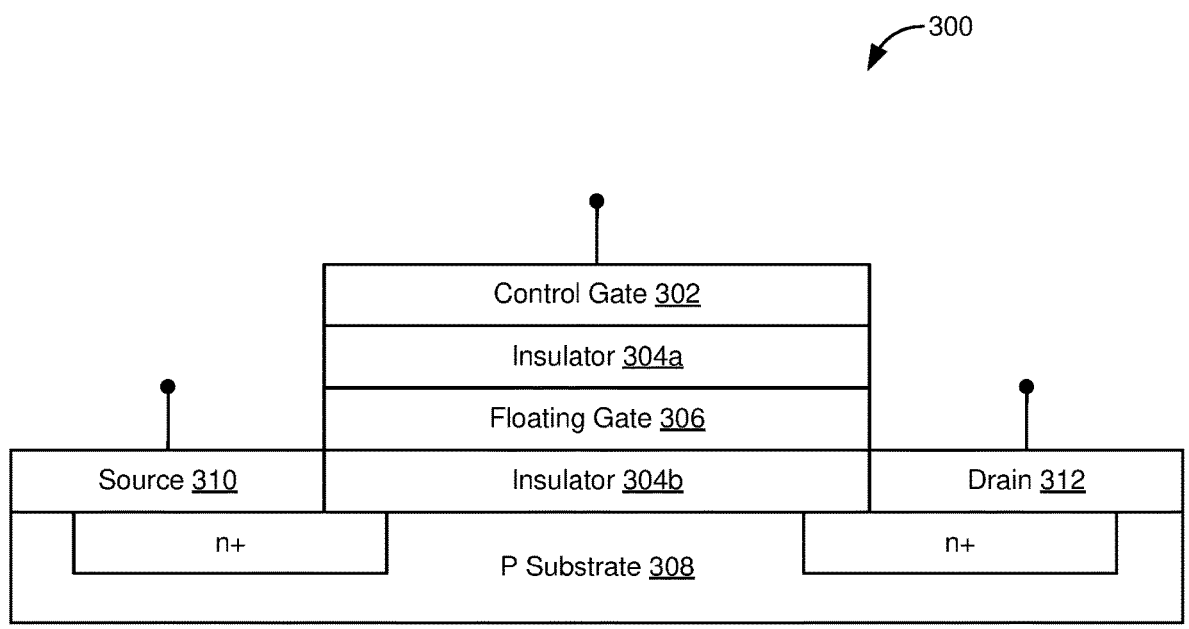
FIG. 3 is a component block diagram illustrating an example UFS device memory cell suitable for implementing any of the various embodiments.

FIG. 3 is a component block diagram illustrating an example UFS device memory cell 300 (or flash memory cell, NAND memory cell, etc.) suitable for implementing various embodiments. With reference to FIGS. 1-3, the UFS device memory cell 300 may be a floating gate transistor (e.g., floating gate metal-oxide-semiconductor field-effect transistor (MOSFET)) and may be configured as a single-level cell and/or a triple-level cell. The UFS device memory cell 300 may include a control gate 302, a pair of insulator layers 304a, 304b, a floating gate 306, a substrate 308 (P substrate in FIG. 3), a source 310 terminal, and a drain 312 terminal.

The control gate 302 may abut the insulator 304a at a first surface of the insulators 304a. The floating gate 306 may abut the insulator 304a at a second surface of the insulator 304a and a first surface of the floating gate 306, and abut the insulator 304b at a first surface of the insulator 304b and a second surface of the floating gate 306. The substrate 308 may abut the insulator 304b at a second surface of the insulator 304b. The source 310 and the drain 312 may abut and/or be partially embedded in the substrate 308.

Applying an electrical current to the control gate 302 may enable electron flow from the source 310 to the drain 312 via the substrate 308. In the non-limiting example illustrated in FIG. 3, the source 310 and the drain 312 may include n+ doped material and the substrate may include p doped material. In various examples, the source 310, the drain 312 and the substrate may alternatively have different concentrations of doped materials, as long as the source 310 and the drain 312 include one type of doped material and the substrate may include a different type of doped material.

The level current applied to the control gate 302 may influence the amount of electrons transmitted from the control gate 302 to the floating gate 306 via the insulator 304a. The insulator 304a may physically separate the control gate 302 and the floating gate 306 and varyingly limit the transmission of electrons from the control gate 302 to the floating gate 306 depending on the level current applied to the control gate 302. The insulator 304a may degrade with repeated use and as the insulator 304a degrades, the capability to varyingly limit the transmission of electrons from the control gate 302 to the floating gate 306. In other words, as degradation of the insulator 304a increases, the insulator 304a may gradually allow greater levels of electron transmission between the control gate 302 and the floating gate 306 for the same current levels applied to the control gate 302. In some examples, the insulator 304 may be a silicon dioxide material.

The amount of electrons at the floating gate 306 may influence the electron flow from the source 310 to the drain 312 via the substrate 308. The insulator 304b may physically separate the floating gate 306 and the substrate 308. An electric field generated by the electrons at the floating gate 306 may traverse the insulator 304b and affect the resistance of the substrate 308 in an inverse relationship. In other words, as floating gate 306 accumulates greater amounts of electrons that generate an increasingly stronger electric field, the resistance of the substrate 308 reduces accordingly. The more the resistance of the substrate 308 reduces, the greater amount of electron flow may occur between the source 310 and the drain 312.

The structure of the UFS device memory cell 300 may enable the same UFS device memory cell 300 to be implemented as a single-single level cell and a triple-level cell. Implemented as a single-level cell, such as via a setting controlled by the UFS device controller (e.g., UFS device controller 116 a processor within the UFS device controller), the UFS device memory cell 300 may represent a one-bit binary value, including "0" or "1". As a single-level cell, the UFS device memory cell 300 may receive two voltage levels at the control gate 302 that may cause the UFS device memory cell 300 to allow or restrict electron flow from the source 310 to the drain 312 via the substrate 308. A voltage at or less than a voltage threshold may be insufficient to permeate the insulator 304a and no or a negligible amount of electrons may present at the floating gate 306, and, accordingly, no or a negligible amount of electrons may flow from the source 310 to the drain 312 via the substrate 308, which may represent the one-bit binary value of "1". A voltage greater than the voltage threshold may be sufficient to permeate the insulator 304a and a non-negligible amount of electrons may present at the floating gate 306, and, accordingly, a non-negligible amount of electrons may flow from the source 310 to the drain 312 via the substrate 308, which may represent the one-bit binary value of "0".

Implemented as a triple-level cell, such as via a setting controlled by the UFS device controller, the UFS device memory cell 300 may represent a three-bit binary value, including values of and between "000" and "111". As a triple-level cell, the UFS device memory cell 300 may receive eight voltage levels at the control gate 302 that may cause the UFS device memory cell 300 to allow or restrict electron flow from the source 310 to the drain 312 via the substrate 308. A voltage at or less than a voltage threshold may be insufficient to permeate the insulator 304a and no or a negligible amount of electrons may present at the floating gate 306, and, accordingly, no or a negligible amount of electrons may flow from the source 310 to the drain 312 via the substrate 308, which may represent the three-bit binary value of "111". A voltage greater than the voltage threshold may be sufficient to permeate the insulator 304a and a non-negligible amount of electrons may present at the floating gate 306, and, accordingly, a non-negligible amount of electrons may flow from the source 310 to the drain 312 via the substrate 308. The amount of voltage greater than the voltage threshold may control the amount of electrons flowing from the source 310 to the drain 312 via the substrate 308, with greater amounts of voltage associated with greater amounts of electrons, which may represent various three-bit binary values of and between "110" to "000" in order of increasing voltage.

Repeated program/erase cycles of the UFS device memory cell 300 degrade the insulators 304a, 304b, diminishing the ability of the UFS device memory cell 300 to maintain the level of granularity of electrons at the floating gate 306 necessary for the UFS device memory cell 300 to be functional as a triple-level cell. A single-level cell may function on a broader range of voltages at the control gate 302 to enable representation of the one-bit binary value as compared to the voltage ranges required for a triple-level cell to enable representation of the three-bit binary value. As the insulators 304a, 304b degrade, the floating gate 306 cannot maintain the amount of electrons needed to represent all the possible three-bit binary values. As a result, the lifespan of the UFS device memory cell 300 to be functional as a triple-level cell is fewer program/erase cycles than the lifespan of the UFS device memory cell 300 to be functional as a single-level cell. Accordingly, even when a UFS device memory cell 300 may not be functional as a triple-level cell, the same UFS device memory cell 300 may still be functional as a single-level cell.

Figure 4A:
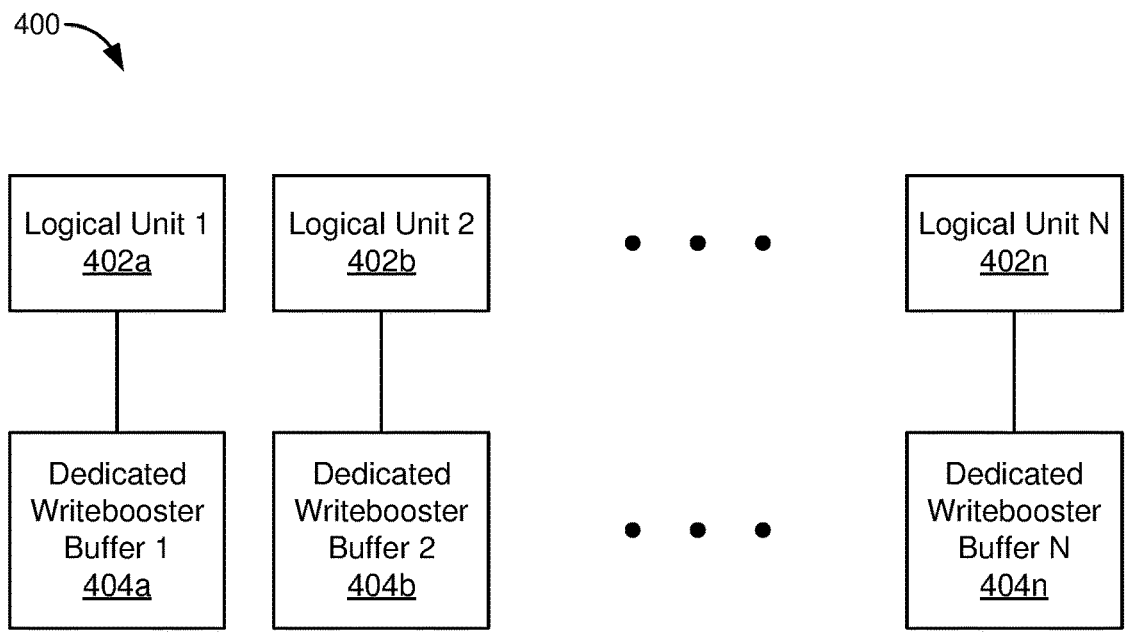
FIGS. 4A and 4B are component block diagrams illustrating examples of UFS devices suitable for implementing any of the various embodiments.
Figure 4B:
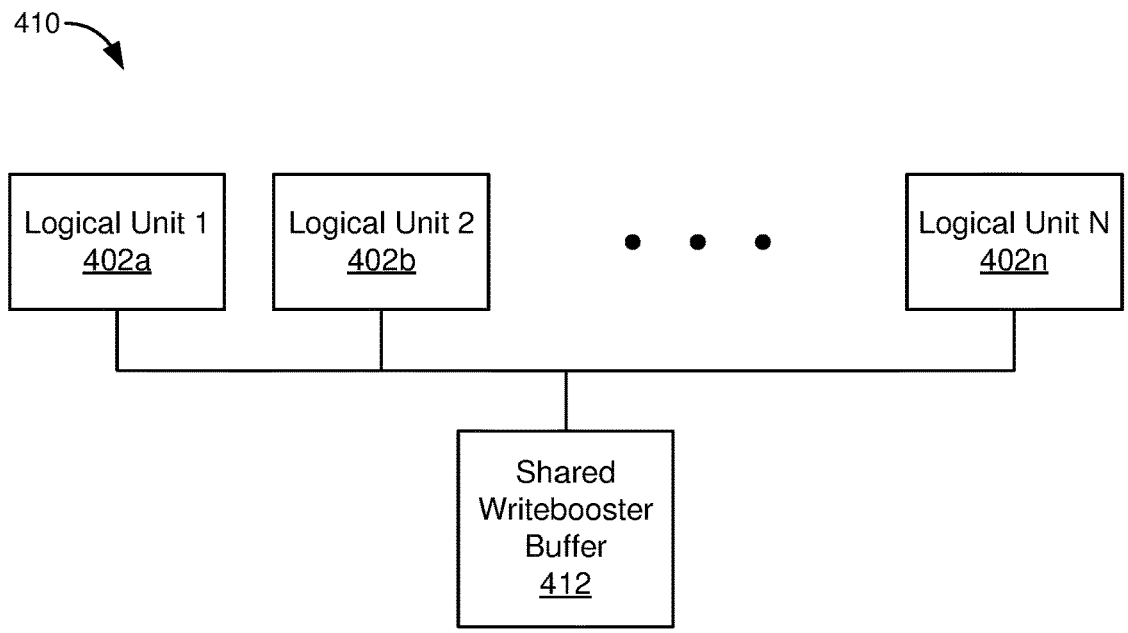

FIGS. 4A and 4B are component block diagrams illustrating examples of UFS devices 400, 410 (e.g., UFS device 106, 272) suitable for implementing various embodiments. With reference to FIGS. 1-4, the UFS memory device 400, 410 may include multiple logical units 402a, 402b, 402n, such as an integer N of logical units (e.g., 2, 4, 8, 16, 32, 64, 128, etc.). The logical units 402a, 402b, 402n may be partitions and/or allocations of memory spaces at the normal storage (e.g., normal storage 112). The normal storage, including the logical units 402a, 402b, 402n, may include flash memory cells (e.g., UFS device memory cell 300) configured as triple-level cells. The logical units 402a, 402b, 402n may be configured by the UFS device controller (e.g., device controller 116, a processor within the UFS device controller) of the UFS memory devices 400, 410, including partitioning and/or allocating memory spaces at the normal storage to assign the logical units 402a, 402b, 402n, mapping of addresses for the logical units 402a, 402b, 402n, configuring the flash memory cells of the UFS memory device 400, 410 as triple-level cells for use at the logical units 402a, 402b, 402n, etc.

The example illustrated in FIG. 4A includes the UFS memory device 400 having multiple dedicated writebooster buffers 404a, 404b, 404n (e.g., writebooster buffer 118), such as an integer N of writebooster buffers (e.g., 2, 4, 8, 16, 32, 64, 128, etc.). Each dedicated writebooster buffers 404a, 404b, 404n may be dedicated for use with a corresponding logical unit 402a, 402b, 402n. Data written to a dedicated writebooster buffer 404a, 404b, 404n may be stored at the dedicated writebooster buffer 404a, 404b, 404n until flushed to the corresponding logical unit 402a, 402b, 402n. The dedicated writebooster buffers 404a, 404b, 404n may include flash memory cells configured as single-level cells. The dedicated writebooster buffers 404a, 404b, 404n may be configured by the UFS device controller of the UFS memory device 400 including mapping of addresses for the dedicated writebooster buffers 404a, 404b, 404n, assignment of each dedicated writebooster buffers 404a, 404b, 404n to a corresponding logical unit 402a, 402b, 402n, configuring the flash memory cells of the UFS memory device 400 as single-level cells for use at the dedicated writebooster buffers 404a, 404b, 404n, etc.

The example illustrated in FIG. 4B includes the UFS memory device 410 having a shared writebooster buffer 412 (e.g., writebooster buffer 118). The shared writebooster buffer 412 may be shared for use with the multiple logical units 402a, 402b, 402n. Data written to the shared writebooster buffer 412 may be stored at the shared writebooster buffer 412 until flushed to at least one of the logical units 402a, 402b, 402n. The shared writebooster buffer 412 may include flash memory cells configured as single-level cells.

The shared writebooster buffer may be configured by the UFS device controller of the UFS memory devices 410, including mapping of addresses for the shared writebooster buffer 412, assignment of the shared writebooster buffer 412 to the logical units 402a, 402b, 402n, configuring the flash memory cells of the UFS memory device 410 as single-level cells for use at the shared writebooster buffer 412, etc.

FIGS. 5A-6B are component block diagrams illustrating examples of UFS device memory cell distributions suitable for implementing various embodiments. With reference to FIGS. 1-6B, the UFS device 500, 600 (e.g., UFS device 106, 272, 400, 410) may include at least one writebooster buffer 502a, 502b, 602a, 602b (e.g., writebooster buffer 118, 404a, 404b, 404n, 412) and at least one normal storage 504a, 504b, 604a, 604b (e.g., normal storage 112, logical unit 402a, 402b, 402n). A writebooster buffer 502a, 502b, 602a, 602b may include flash memory cells (e.g., UFS device memory cell 300) configured as single-level cells. A normal storage 504a, 504b, 604a, 604b may include flash memory cells configured as triple-level cells. The flash memory cells configured as single-level cells and as triple-level cells and assigned to the writebooster buffer 502a, 502b, 602a, 602b and to the normal storage 504a, 504b, 604a, 604b may be configured and assigned by the UFS device controller (e.g., device controller 116, a processor within the UFS device controller).

A degradation attribute, configured to indicate a level of degradation of individual and/or groups of flash memory cells to the UFS device controller, may be tracked at the UFS device 500, 600. The UFS device controller may track and/or read the degradation attribute of the individual and/or groups of flash memory cells. The level of degradation represented by the degradation attribute may be tracked in various manners. For example, the level degradation may be tracked by tracking program/erase cycles of the individual and/or groups of flash memory cells, such as by updating a counter register configured to store a value representing the number of program/erase cycles of associated individual and/or groups of flash memory cells. The degradation attribute may be a value of the counter register and/or a value representing a result of a comparison and/or calculation based on the value of the counter register and one or more flash memory cell degradation thresholds configured to represent values at which the individual and/or groups of flash memory cells may and/or may not be functional as triple-level cells and/or single-level cells. As another example, the level degradation may be tracked by tracking results of a self-test process by the UFS device 500, 600 configured for checking the current through the individual and/or groups of flash memory cells for different voltages applied to the control gates (e.g., control gate 302). The degradation attribute may be a value of a result of the self-test process and/or a value representing result of a comparison and/or calculation based on the result of the self-test process and one or more flash memory cell degradation thresholds configured to represent values at which the individual and/or groups of flash memory cells may and/or may not be functional as triple-level cells and/or single-level cells.

Using the degradation attribute, the UFS device controller may identify the individual and/or groups of flash memory cells that may and/or may not be functional as triple-level cells and/or single-level cells. In some examples, the UFS device controller may identify the individual and/or groups of flash memory cells that may not be functional as triple-level cells and may be functional as single-level cells. In some examples, the UFS device controller may identify the individual and/or groups of flash memory cells that may not be functional as single-level cells.

Based on the degradation attribute and/or identification of the individual and/or groups of flash memory cells that may not be functional as triple-level cells, the UFS device controller may identify and set an amount of degraded triple-level cells attribute. The amount of degraded triple-level cells attribute may include a value configured to represent an amount of flash memory cells that are configured as triple-level cells that are not functional as triple-level cells to the UFS device controller and/or the host controller (e.g., host controller 104). For example, the amount of degraded triple-level cells attribute may be a number, a percentage, a ratio, other calculated representation, etc. of the amount of flash memory cells that are configured as triple-level cells that are not functional as triple-level cells. In some examples, the amount of degraded triple-level cells attribute may include a value configured to represent the amount of flash memory cells that are configured as triple-level cells that are not functional as triple-level cells and may be functional as single-level cells. In some examples, the UFS device controller may set the amount of degraded triple-level cells attribute by setting the value of the amount of degraded triple-level cells attribute to a dedicated register (not shown) at the UFS device 500, 600.

Figure 5A:
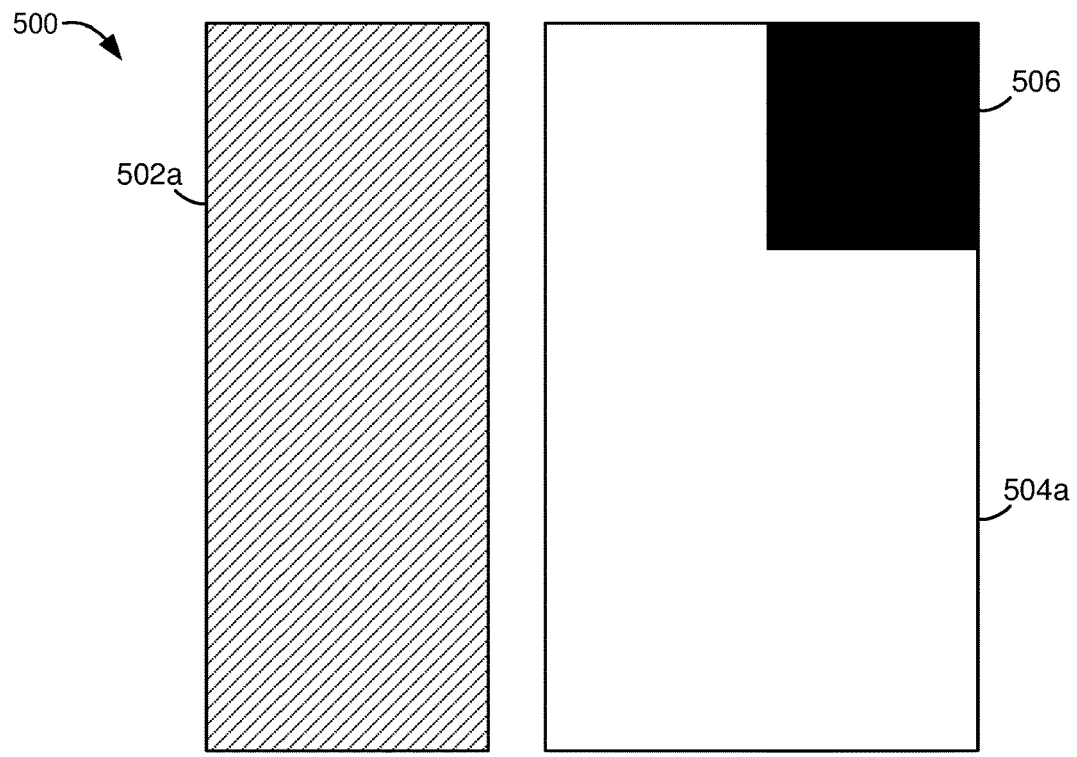
FIGS. 5A and 5B are component block diagrams illustrating examples of UFS device memory cell distributions in accordance with some embodiments.
Figure 5B:
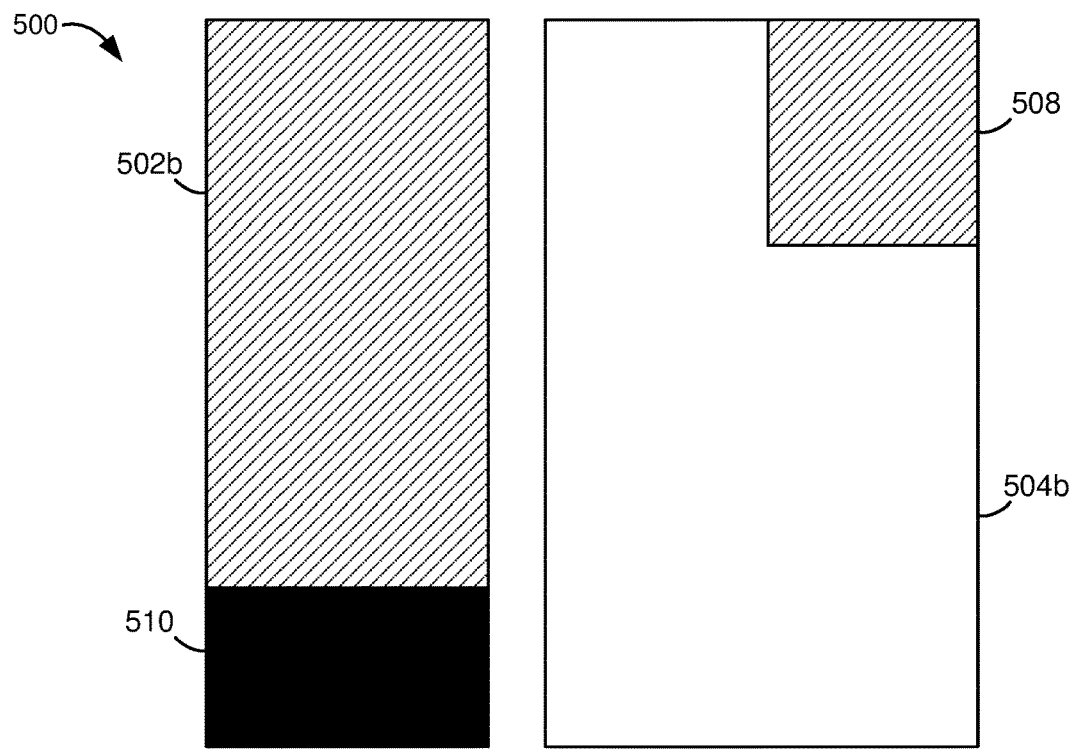

The examples of FIGS. 5A and 5B illustrate a situation in which the normal storage 504a may include degraded flash memory cells configured as triple-level cells 506 that may be reconfigured as single-level cells 510 and included as part of the writebooster buffer 502b. In FIG. 5A, the writebooster buffer 502a may include flash memory cells configured as single-level cells, at least some of which may be functional as triple-level cells. The normal storage 504a may include flash memory cells configured as triple-level cells, at least some of which may not be functional as triple-level cells.

The UFS device controller may identify which individual and/or groups of flash memory cells configured as triple-level cells and assigned to the normal storage 504a may not be functional as triple-level cells based on the degradation attribute of the flash memory cells. For example, the UFS device controller may identify the degraded flash memory cells configured as triple-level cells 506. Based on the degradation attribute and/or identification of the individual and/or groups of flash memory cells that may not be functional as triple-level cells, the UFS device controller may identify and set an amount of degraded triple-level cells attribute.

The host controller may access the amount of degraded triple-level cells attribute and respond to the amount of degraded triple-level cells attribute with a signal to the UFS device controller to reconfigure the UFS device 500. The UFS device controller may identify which individual and/or groups of flash memory cells configured as single-level cells and assigned to the writebooster buffer 502a may be functional as triple-level cells based on the degradation attribute of the flash memory cells. In some examples, the UFS device controller may identify sufficient individual and/or groups of flash memory cells configured as single-level cells and assigned to the writebooster buffer 502a that may be functional as triple-level cells to equal the amount of normal storage capacity lost by the degraded flash memory cells configured as triple-level cells 506.

The UFS device controller may configure the degraded flash memory cells configured as triple-level cells 506 as single-level cells 510 and assign the flash memory cells configured as single-level cells 510 to the writebooster buffer 502b. The UFS device controller may configure the identified individual and/or groups of flash memory cells configured as single-level cells assigned to the writebooster buffer 502a as triple-level cells 508 and assign the flash memory cells configured as triple-level cells 508 to the normal storage 504b.

Configuring the flash memory cells as single-level cells 510 and/or triple-level cells 508 may include the UFS device controller setting a value of a single-level cell and/or triple-level cell modes for individual and/or groups of flash memory cells. Flash memory cells associated with an active single-level cell mode and/or inactive triple-level cell mode set by the UFS device controller may be configured as single-level cells 510 for the writebooster buffer 502b. Flash memory cells associated with an inactive single-level cell mode and/or active triple-level cell mode set by the UFS device controller may be configured as triple-level cells 508 for the normal storage 504b. Setting the value of the single-level cell and/or triple-level cell modes for individual and/or groups of flash memory cells may include the UFS device controller setting values in associated registers at the UFS device 500 and/or software data structures read by the UFS device controller.

Figure 6A:
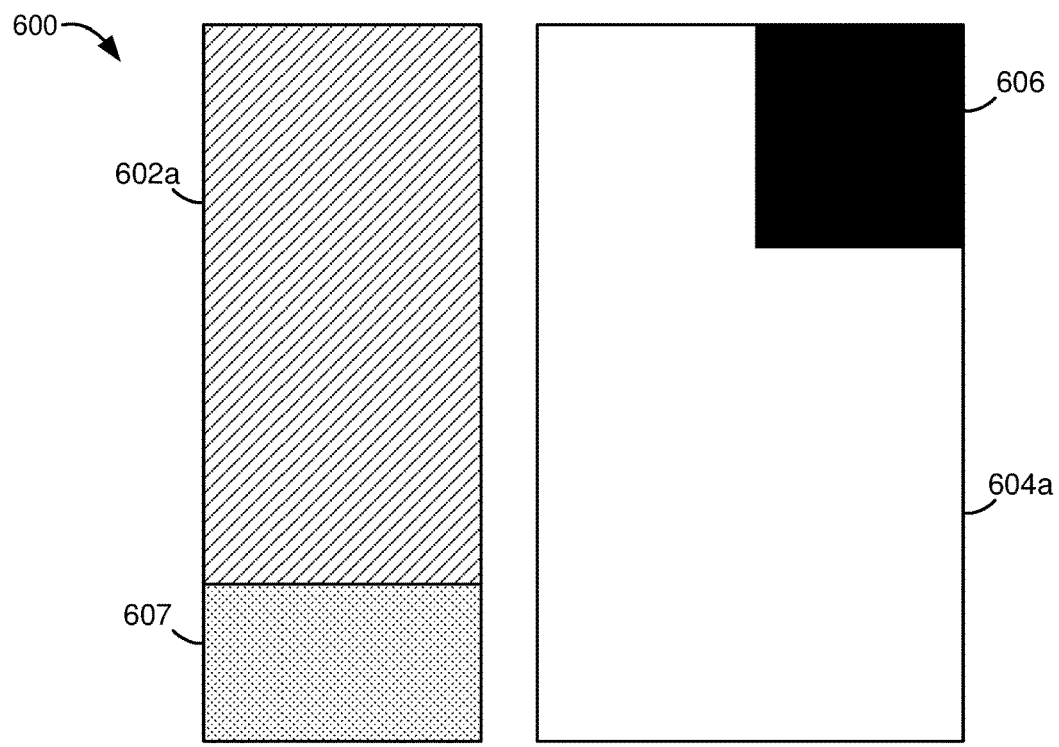
FIGS. 6A and 6B are component block diagrams illustrating examples of UFS device memory cell distributions in accordance with some embodiments.
Figure 6B:
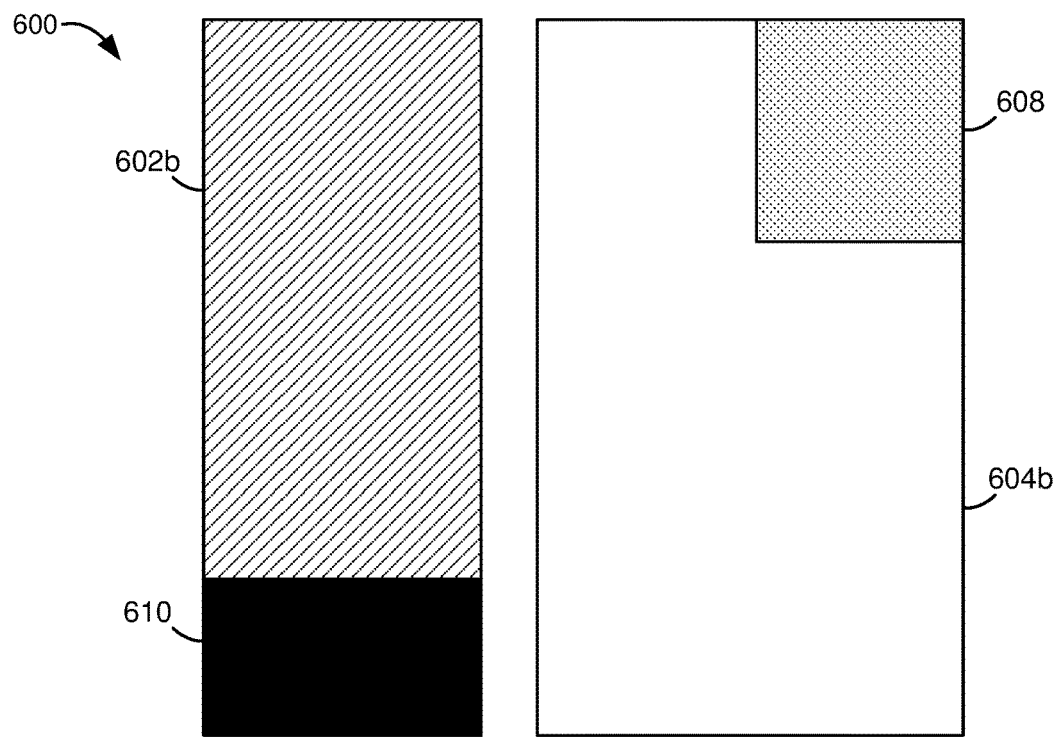

The examples of FIGS. 6A and 6B illustrate a situation in which the normal storage 604a may include degraded flash memory cells configured as triple-level cells 606 that may be reconfigured as single-level cells 610 and included as part of the writebooster buffer 602b. In FIG. 6A, the writebooster buffer 602a may include flash memory cells configured as single-level cells, at least some of which may be degraded flash memory cells configured as single-level cells 607 that may not be functional as single-level cells. The normal storage 604a may include flash memory cells configured as triple-level cells, at least some of which may be degraded flash memory cells configured as triple-level cells 606 that may not be functional as triple-level cells and may be functional as single-level cells.

The UFS device controller may identify which individual and/or groups of flash memory cells configured as triple-level cells and assigned to the normal storage 604a may be not functional as triple-level cells based on the degradation attribute of the flash memory cells. For example, the UFS device controller may identify the degraded flash memory cells configured as triple-level cells 606. Based on the degradation attribute and/or identification of the individual and/or groups of flash memory cells that may not be functional as triple-level cells, the UFS device controller may identify and set an amount of degraded triple-level cells attribute.

The host controller may access the amount of degraded triple-level cells attribute and respond to the amount of degraded triple-level cells attribute with a signal to the UFS device controller to reconfigure the UFS device 600. The UFS device controller may identify which individual and/or groups of degraded flash memory cells configured as single-level cells 607 that may not be functional as single-level cells based on the degradation attribute of the flash memory cells. The identified degraded flash memory cells configured as single-level cells 607 may be assigned to the writebooster buffer 602a.

The UFS device controller may identify sufficient degraded flash memory cells configured as triple-level cells 606 assigned to the normal storage 604a that may be functional as single-level cells to equal the amount of writebooster buffer capacity lost by the degraded flash memory cells configured as single-level cells 607. The UFS device controller may configure the degraded flash memory cells configured as triple-level cells 606 as single-level cells 610 and assign the flash memory cells configured as single-level cells 610 to the writebooster buffer 602b. The UFS device controller may configure the degraded flash memory cells configured as single-level cells 607 assigned to the writebooster buffer 602a as inactive (or unallocated, or discarded, etc.) flash memory cells 608. In some examples, the inactive (or unallocated, or discarded, etc.) flash memory cells 608 may be assigned to the normal storage 604b.

Configuring the flash memory cells as single-level cells 610 may include the UFS device controller setting a value of a single-level cell and/or triple-level cell modes for individual and/or groups of flash memory cells. Flash memory cells associated with an active single-level cell mode and/or inactive triple-level cell mode set by the UFS device controller may be configured as single-level cells 610 for the writebooster buffer 602b. Setting the value of the single-level cell and/or triple-level cell modes for individual and/or groups of flash memory cells may include the UFS device controller setting values in associated registers at the UFS device 600 and/or software data structures read by the UFS device controller.

Configuring the flash memory cells as inactive flash memory cells 608 may include the UFS device controller setting a value of active cell and/or inactive cell modes for individual and/or groups of flash memory cells. Flash memory cells associated with an inactive active cell mode and/or inactive cell mode set by the UFS device controller may be configured as inactive flash memory cells 608 for the normal storage 604b. Setting the value of the active cell mode and/or inactive cell mode for individual and/or groups of flash memory cells may include the UFS device controller setting values in associated registers at the UFS device 600 and/or software data structures read by the UFS device controller.

Figure 7:
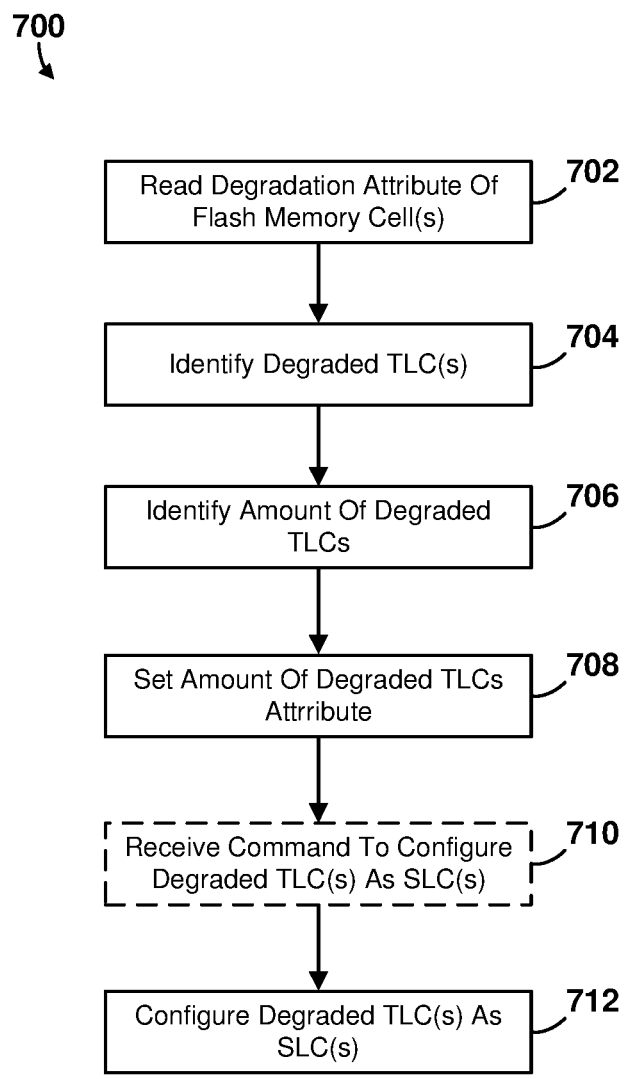
FIG. 7 is a process flow diagram of an example method for enhancing endurance of UFS devices in accordance with some embodiments.

FIG. 7 is a process flow diagram of an example method 700 that may be performed by a UFS device controller (e.g., device controller 116, a processor within the UFS device controller) for enhancing endurance of UFS devices (e.g., UFS device 106, 400, 410, 500, 600) in accordance with various embodiments. With reference to FIGS. 1-7, the method 700 may be performed by a UFS device controller (e.g., device controller 116, a processor within the UFS device controller) of a computing device (e.g., system 100, computing device 200). In some embodiments, the UFS device controller may include a processor configured to perform the operations by processor-executable instructions stored in a non-transitory processor-readable medium (e.g., SRAM 118, memory 220, 258, DRAM 270). Means for performing the operations of the method 700 may be the UFS device controller, the processor, and/or the like as described with reference to FIGS. 1-7.

In block 702, the UFS device controller may read the degradation attribute of at least one flash memory cell (e.g., UFS device memory cell 300). The degradation attribute may indicate a level of degradation of individual and/or groups of flash memory cells to the UFS device controller. In some examples, the level of degradation of individual and/or groups of flash memory cells may be based on the number of program/erase cycles that have been performed on the individual and/or groups of flash memory cells. The UFS device controller may track and/or read the degradation attribute of the individual and/or groups of flash memory cells. For example, the UFS device controller may write to and/or read from a register having a value of the degradation attribute of individual and/or groups of flash memory cells.

In block 704, the UFS device controller may identify at least one degraded flash memory cell configured as a triple-level cell. In some examples, a degraded flash memory cell configured as a triple-level cell may be a flash memory cell configured as a triple-level cell that may not be functional as a triple-level cell. Whether a flash memory cell configured as a triple-level cell is functional as a triple-level may be based on a comparison of the degradation attribute of the flash memory cell and a flash memory cell degradation threshold configured to represent a value at which the individual and/or groups of flash memory cells may not be functional as triple-level cells. The UFS device controller may compare the degradation attribute and the degradation threshold for the individual and/or groups of flash memory cells and identify that at least one flash memory cell configured as a triple-level cell is a degraded flash memory cell.

Whether a flash memory cell configured as a triple-level cell may be based on settings of single-level cell and/or triple-level cell modes, such that the one or more modes are set to indicate that the flash memory cell is configured as a triple-level cell. The UFS device controller may read the setting of the single-level cell and/or triple-level cell modes for the at least one degraded flash memory cell and identify that the at least one degraded flash memory cell is configured as a triple-level cell.

In some examples, the order of the identifications of at least one degraded flash memory cell and that the at least one degraded flash memory cell is configured as a triple-level cell may be reversed. In other words, the UFS device controller may first identify at least one flash memory cell configured as a triple-level cell based on the single-level cell and/or triple-level cell modes. Then the UFS device controller may identify that the at least one flash memory cell configured as a triple-level cell is a degraded flash memory cell based on the degradation attribute for the flash memory cell and the degradation threshold for the individual and/or groups of flash memory cells.

In block 706, the UFS device controller may identify an amount of degraded flash memory cells configured as triple-level cells. In some examples, degraded flash memory cells configured as triple-level cells may be counted and/or calculated individually and/or in groups of flash memory cells.

In block 708, the UFS device controller may set an amount of degraded triple-level cells attribute. The amount of degraded triple-level cells attribute may include a value configured to represent an amount of flash memory cells that are configured as triple-level cells that are not functional as triple-level cells to the UFS device controller and/or the host controller (e.g., host controller 104). For example, the amount of degraded triple-level cells attribute may be a number, a percentage, a ratio, other calculated representation, etc. of the amount of flash memory cells that are configured as triple-level cells that are not functional as triple-level cells. In some examples, the UFS device controller may set the amount of degraded triple-level cells attribute by setting the value of the amount of degraded triple-level cells attribute to a dedicated register at the UFS device.

In some examples, the UFS device controller may iteratively identify an amount of degraded flash memory cells configured as triple-level cells in block 706 and set an amount of degraded triple-level cells attribute in block 708. The iterative execution may be such that iteratively setting an amount of degraded triple-level cells attribute in block 708 updates the amount of degraded triple-level cells attribute based on iteratively identifying amount of degraded flash memory cells configured as triple-level cells in block 706.

In optional block 710, the UFS device controller may receive a command to configure as a single-level cell at least one degraded flash memory cell that is configured as triple-level cell. The amount of degraded triple-level cells attribute may be accessible to the host controller, which, in response to accessing the amount of degraded triple-level cells attribute, the host controller may send the command to configure as a single-level cell at least one degraded flash memory cells that is configured as triple-level cell to the UFS device controller.

In block 712, the UFS device controller may configure degraded flash memory cells configured as triple-level cells to be single-level cells. Configuring the degraded flash memory cells configured as triple-level cells to be single-level cells may be implemented by the UFS device controller, for example, by changing settings of the single-level cell and/or triple-level cell modes associated with the degraded flash memory cells. Configuring the degraded flash memory cells configured as triple-level cells to be single-level cells is described further herein for the method 800 with reference to FIG. 8.

Figure 8:
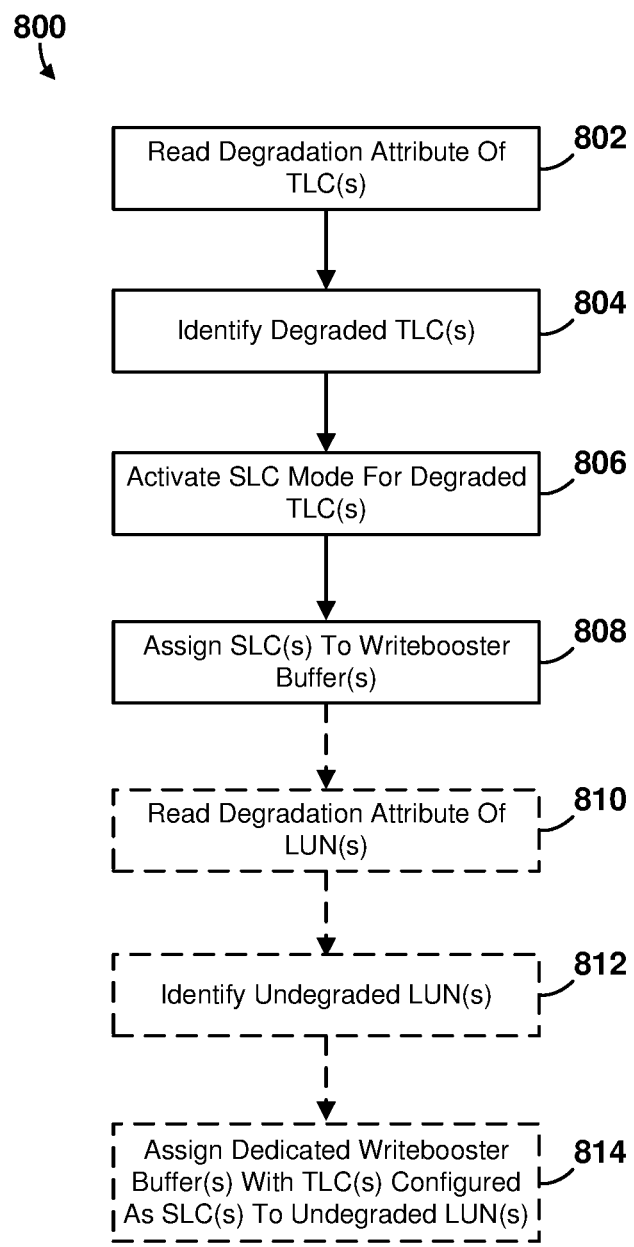
FIG. 8 is a process flow diagram of an example method for configuring degraded triple-level cells (TLCs) as single-level cells (SLCs) in UFS devices in accordance with some embodiments.

FIG. 8 is a process flow diagram of an example method 800 that may be performed by a UFS device controller (e.g., device controller 116, a processor within the UFS device controller) for configuring degraded triple-level cells as single-level cells in UFS devices (e.g., UFS device 106, 400, 410, 500, 600) in accordance with various embodiments. With reference to FIGS. 1-8, the method 800 may be performed by a UFS device controller (e.g., device controller 116, a processor within the UFS device controller) of a computing device (e.g., system 100, computing device 200). In some embodiments, the UFS device controller may include a processor configured to perform the operations by processor-executable instructions stored in a non-transitory processor-readable medium (e.g., SRAM 118, memory 220, 258, DRAM 270). Means for performing the operations of the method 800 may be the UFS device controller, the processor, and/or the like as described with reference to FIGS. 1-8. The method 800 may further describe block 712 of the method 700 described with reference to FIG. 7.

In block 802, the UFS device controller may read the degradation attribute of at least one flash memory cell (e.g., UFS device memory cell 300) configured as a triple-level cell. The degradation attribute may indicate a level of degradation of individual and/or groups of flash memory cells configured as triple-level cells to the UFS device controller. In some examples, the level of degradation of individual and/or groups of flash memory cells configured as triple-level cells may be based on the number of program/erase cycles that have been performed on the individual and/or groups of flash memory cells. The UFS device controller may track and/or read the degradation attribute of the individual and/or groups of flash memory cells configured as triple-level cells. For example, the UFS device controller may write to and/or read from a register having a value of the degradation attribute of individual and/or groups of flash memory cells configured as triple-level cells.

Whether a flash memory cell configured as a triple-level cell may be based on settings of single-level cell and/or triple-level cell modes, such that the one or more modes are set to indicate that the flash memory cell is configured as a triple-level cell. The UFS device controller may read the setting of the single-level cell and/or triple-level cell modes for the at least one flash memory cell and identify that the at least one flash memory cell is configured as a triple-level cell.

In block 804, the UFS device controller may identify at least one degraded flash memory cell configured as a triple-level cell. In some examples, a degraded flash memory cell configured as a triple-level cell may be a flash memory cell configured as a triple-level cell that may not be functional as a triple-level cell. Whether a flash memory cell configured as a triple-level cell is functional as a triple-level may be based on a comparison of the degradation attribute of the flash memory cell and a flash memory cell degradation threshold configured to represent a value at which the individual and/or groups of flash memory cells may not be functional as triple-level cells. The UFS device controller may compare the degradation attribute and the degradation threshold for the individual and/or groups of flash memory cells and identify that at least one flash memory cell configured as a triple-level cell is a degraded flash memory cell. In some embodiments, comparing the degradation attribute and the degradation threshold for the individual and/or groups of degraded flash memory cells may also identify that at least one degraded flash memory cell configured as a triple-level cell may be functional as a single-level cell.

In block 806, the UFS device controller may activate a single-level mode for the at least one degraded flash memory cell configured as a triple-level cell. Activating the single-level mode may include setting a value of a single-level cell and/or triple-level cell modes for individual and/or groups of flash memory cells. Flash memory cells associated with an active single-level cell mode and/or inactive triple-level cell mode set by the UFS device controller may be configured as single-level cells. Setting the value of the single-level cell and/or triple-level cell modes for individual and/or groups of flash memory cells may include the UFS device controller setting values in associated registers at the UFS device and/or software data structures read by the UFS device controller. Activating the single-level mode for the at least one degraded flash memory cell configured as a triple-level cell may convert the at least one degraded flash memory cell to an at least one degraded flash memory cell configured as a single-level cell.

In block 808, the UFS device controller may assign the at least one degraded flash memory cell configured as a single-level cell (formerly configured as a triple-level cell) to at least one writebooster buffer (e.g., writebooster buffer 118, 404a, 404b, 404n, 412, 502a, 502b, 602a, 602b). In some embodiments, to which at least one writebooster buffer the UFS device controller may assign the at least one degraded flash memory cell configured as a single-level cell may be based on from which writebooster buffer at least one flash memory cell configured as a triple-level cell, as described herein for the method 900 with reference to FIG. 9. In some embodiments, to which at least one writebooster buffer the UFS device controller may assign the at least one degraded flash memory cell configured as a single-level cell may be based on from which writebooster buffer at least one flash memory cell configured as a single-level cell is discarded, as described herein for the method 1000 with reference to FIG. 10.

In optional block 810, the UFS device controller may read a degradation attribute of at least one logical unit (LUN e.g., normal storage 112, logical unit 402a, 402b, 402n, 504a, 504b, 604a, 604b). Similar, to the degradation attribute of an individual and/or group of flash memory cells, the degradation attribute of a logical unit may be configured to indicate a level of degradation of logical units, or groups of flash memory cells, to the UFS device controller. In some examples, the level of degradation of a logical unit may be based on the number of program/erase cycles that have been performed on the logical unit. The UFS device controller may track and/or read the degradation attribute of the logical unit. For example, the UFS device controller may write to and/or read from a register having a value of the degradation attribute of the logical unit. In some examples, the level of degradation of the logical unit may be based on the level of degradation of groups of flash memory cells configured as triple-level cells.

In optional block 812, the UFS device controller may identify an undegraded logical unit. The undegraded logical unit may be identified by comparing the degradation attribute of the logical unit to a logical unit degradation threshold and/or to the degradation attribute of other logical units. An undegraded logical unit may be a logical unit for which the degradation attribute of the logical unit falls short of (i.e., is less than) the logical unit degradation threshold. An undegraded logical unit may be a logical unit for which the degradation attribute of the logical unit falls short of the degradation attribute of other logical units. In other words, an undegraded logical unit may be a logical unit that is less degraded than the other logical units.

In optional block 814, the UFS device controller may assign at least one dedicated writebooster buffer having at least one degraded flash memory cell configured as a single-level cell (formerly configured as a triple-level cell) to at least one undegraded logical unit.

Figure 9:
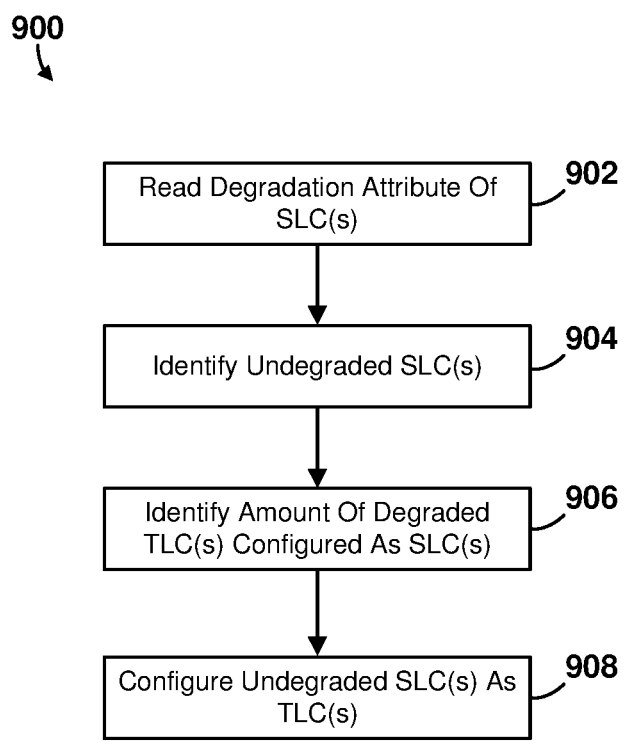
FIG. 9 is a process flow diagram of an example method for configuring degraded TLCs as SLCs in UFS devices in accordance with some embodiments.

FIG. 9 is a process flow diagram of an example method 900 that may be performed by a UFS device controller (e.g., device controller 116, a processor within the UFS device controller) for configuring degraded triple-level cells as single-level cells in UFS devices (e.g., UFS device 106, 400, 410, 500, 600) in accordance with various embodiments. With reference to FIGS. 1-9, the method 900 may be performed by a UFS device controller (e.g., device controller 116, a processor within the UFS device controller) of a computing device (e.g., system 100, computing device 200). In some embodiments, the UFS device controller may include a processor configured to perform the operations by processor-executable instructions stored in a non-transitory processor-readable medium (e.g., SRAM 118, memory 220, 258, DRAM 270). Means for performing the operations of the method 900 may be the UFS device controller, the processor, and/or the like as described with reference to FIGS. 1-9. The method 900 may implemented in parallel to and/or serially to any part of the methods 700, 800 described with reference to FIGS. 7 and 8. The method 900 may further describe block 712 of the method 700 described with reference to FIG. 7.

In block 902, the UFS device controller may read the degradation attribute of at least one flash memory cell (e.g., UFS device memory cell 300) configured as a single-level cell. The degradation attribute may indicate a level of degradation of individual and/or groups of flash memory cells configured as single-level cells to the UFS device controller. In some examples, the level of degradation of individual and/or groups of flash memory cells configured as single-level cells may be based on the number of program/erase cycles that have been performed on the individual and/or groups of flash memory cells. The UFS device controller may track and/or read the degradation attribute of the individual and/or groups of flash memory cells configured as single-level cells. For example, the UFS device controller may write to and/or read from a register having a value of the degradation attribute of individual and/or groups of flash memory cells configured as single-level cells.

Whether a flash memory cell configured as a single-level cell may be based on settings of single-level cell and/or triple-level cell modes, such that the one or more modes are set to indicate that the flash memory cell is configured as a single-level cell. The UFS device controller may read the setting of the single-level cell and/or triple-level cell modes for the at least one flash memory cell and identify that the at least one flash memory cell is configured as a single-level cell.

In block 904, the UFS device controller may identify at least one undegraded flash memory cell configured as a single-level cell. In some examples, an undegraded flash memory cell configured as a single-level cell may be a flash memory cell configured as a single-level cell that may be functional as a triple-level cell. Whether a flash memory cell configured as a single-level cell is functional as a triple-level may be based on a comparison of the degradation attribute of the flash memory cell and a flash memory cell degradation threshold configured to represent a value at which the individual and/or groups of flash memory cells may be functional as triple-level cells. The UFS device controller may compare the degradation attribute and the degradation threshold for the individual and/or groups of flash memory cells and identify that at least one flash memory cell configured as a single-level cell is an undegraded flash memory cell.

In block 906, the UFS device controller may identify a number of degraded flash memory cells configured as triple-level cells that are configured to be single-level cells. The amount of degraded flash memory cells configured as a triple-level cells that are configured to be single-level cells may be based on the amount of degraded triple-level cells attribute set in block 708 of the method 700, described with reference to FIG. 7. The amount of degraded flash memory cells configured as a triple-level cells that are configured to be single-level cells may be based on configuring degraded flash memory cells configured as triple-level cells to be single-level cells in block 712 or the method 700, described herein with reference to FIG. 7. For example, the number of degraded flash memory cells configured as triple-level cells that are configured to be single-level cells may be a number of degraded flash memory cells configured from triple-level cells to single-level cells.

In block 908, the UFS device controller may configure at least one undegraded flash memory cell configured as a single-level cell to be a triple-level cell. Configuring the undegraded flash memory cells configured as single-level cells to be triple-level cells may be implemented by the UFS device controller, for example, by changing settings of the single-level cell and/or triple-level cell modes associated with the undegraded flash memory cells. Configuring the undegraded flash memory cells configured as single-level cells to be triple-level cells may include assigning the undegraded flash memory cells configured as triple-level cells to a logical unit (LUN; e.g., normal storage 112, logical unit 402a, 402b, 402n, 504a, 504b, 604a, 604b). In some embodiments in which the SLC is part of a writebooster buffer, configuring the undegraded flash memory cells configured as single-level cells to be triple-level cells in block 908 may include assigning the writebooster buffer having at least one degraded flash memory cell configured as a single-level cell to at least one undegraded logical unit. In such embodiments, the degraded flash memory cell may be identified as degraded based on the number of degraded TLCs attribute, and a degraded flash memory cell is not functional as a TLC and functional as an SLC, and the undegraded logical unit may have a degradation value that is less than a logical unit degradation threshold.

Figure 10:
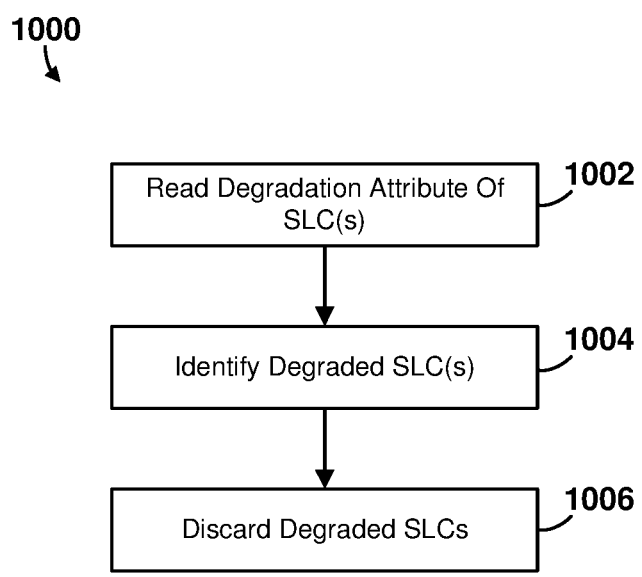
FIG. 10 is a process flow diagram of an example method for configuring degraded TLCs as SLCs in UFS devices in accordance with some embodiments.

FIG. 10 is a process flow diagram of an example method 1000 that may be performed by a UFS device controller (e.g., device controller 116, a processor within the UFS device controller) for configuring degraded s-level cells as single-level cells in UFS devices (e.g., UFS device 106, 400, 410, 500, 600) in accordance with various embodiments. With reference to FIGS. 1-10, the method 1000 may be performed by a UFS device controller (e.g., device controller 116, a processor within the UFS device controller) of a computing device (e.g., system 100, computing device 200). In some embodiments, the UFS device controller may include a processor configured to perform the operations by processor-executable instructions stored in a non-transitory processor-readable medium (e.g., SRAM 118, memory 220, 258, DRAM 270). Means for performing the operations of the method 1000 may be the UFS device controller, the processor, and/or the like as described with reference to FIGS. 1-10. The method 1000 may implemented in parallel to and/or serially to any part of the methods 700, 800 described with reference to FIGS. 7 and 8. The method 1000 may further describe block 712 of the method 700 described with reference to FIG. 7.

In block 1002, the UFS device controller may read the degradation attribute of at least one flash memory cell (e.g., UFS device memory cell 300) configured as a single-level cell. The degradation attribute may indicate a level of degradation of individual and/or groups of flash memory cells configured as single-level cells to the UFS device controller. In some examples, the level of degradation of individual and/or groups of flash memory cells configured as single-level cells may be based on the number of program/erase cycles that have been performed on the individual and/or groups of flash memory cells. The UFS device controller may track and/or read the degradation attribute of the individual and/or groups of flash memory cells configured as single-level cells. For example, the UFS device controller may write to and/or read from a register having a value of the degradation attribute of individual and/or groups of flash memory cells configured as single-level cells.

Whether a flash memory cell configured as a single-level cell may be based on settings of single-level cell and/or triple-level cell modes, such that the one or more modes are set to indicate that the flash memory cell is configured as a single-level cell. The UFS device controller may read the setting of the single-level cell and/or triple-level cell modes for the at least one flash memory cell and identify that the at least one flash memory cell is configured as a single-level cell.

In block 1004, the UFS device controller may identify at least one degraded flash memory cell configured as a single-level cell. In some examples, a degraded flash memory cell configured as a single-level cell may be a flash memory cell configured as a single-level cell that may not be functional as a single-level cell. Whether a flash memory cell configured as a single-level cell is functional as a single-level may be based on a comparison of the degradation attribute of the flash memory cell and a flash memory cell degradation threshold configured to represent a value at which the individual and/or groups of flash memory cells may not be functional as single-level cells. The UFS device controller may compare the degradation attribute and the degradation threshold for the individual and/or groups of flash memory cells and identify that at least one flash memory cell configured as a single-level cell is a degraded flash memory cell.

In block 1006, the UFS device controller may discard the at least one degraded flash memory cell configured as a single-level cell. Discarding the at least one degraded flash memory cell configured as a single-level cell may include unallocated the degraded flash memory cell from a write-booster buffer (e.g., writebooster buffer 118, 404*a*, 404*b*, 404*n*, 412, 502*a*, 502*b*, 602*a*, 602*b*) and/or not allocating the degraded flash memory cell to a writebooster buffer.

Figure 11:
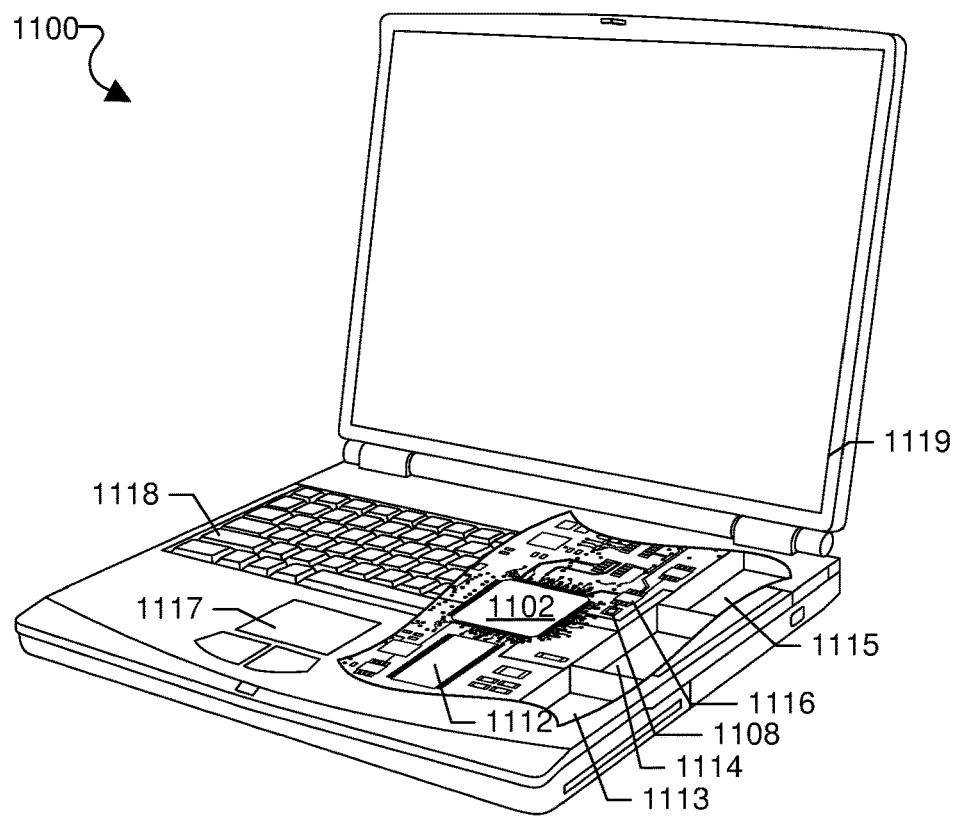
FIG. 11 is a component block diagram illustrating an example computing device suitable for use with the various embodiments.

Various embodiments (including, but not limited to, embodiments described with reference to FIGS. 1-10) may be implemented in a wide variety of computing systems, which may include a laptop computer 1100 (e.g., computing device 100, 200), an example of which is illustrated in FIG. 11. With reference to FIGS. 1-7, a laptop computer may include a touchpad touch surface 1117 that serves as the computer's pointing device, and thus may receive drag, scroll, and flick gestures similar to those implemented on computing devices equipped with a touch screen display and described above. A laptop computer 1100 will typically include a processor 1102 coupled to volatile memory 1112 and a large capacity nonvolatile memory, such as a disk drive 1113 of Flash memory. Additionally, the computer 1100 may have one or more antenna 1108 for sending and receiving electromagnetic radiation that may be connected to a wireless data link and/or cellular telephone transceiver 1116 coupled to the processor 1102. The computer 1100 may also include a floppy disc drive 1114 and a compact disc (CD) drive 1115 coupled to the processor 1102. The laptop computer 1100 may include a touchpad 1117, a keyboard 1118, and a display 1119 all coupled to the processor 1102. Other configurations of the computing device may include a computer mouse or trackball coupled to the processor (e.g., via a univewrsal serial bus (USB) input) as are well known, which may also be used in conjunction with the various embodiments.

Figure 12:
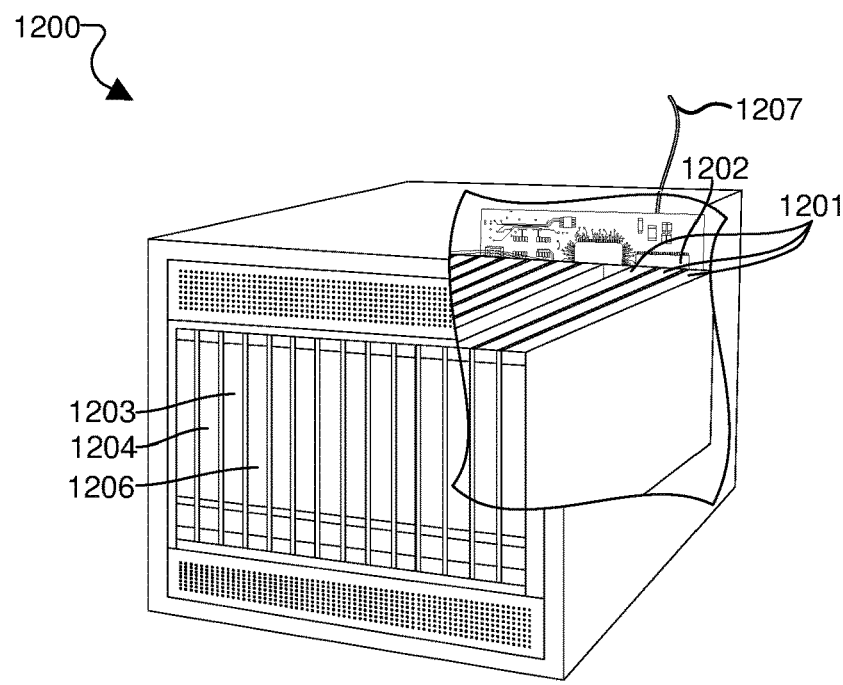
FIG. 12 is a component block diagram illustrating an example server suitable for use with the various embodiments.

FIG. 12 is a component block diagram of a computing device 1200, such as a server, suitable for use with various embodiments. Such computing devices may include at least the components illustrated in FIG. 12. With reference to FIGS. 1-10, the computing device 1200 (e.g., computing device 100, 200) may include a processor 1201 coupled to volatile memory 1202 and a large capacity nonvolatile memory, such as a disk drive 1203.

The computing device 1200 may also include a peripheral memory access device such as a floppy disc drive, compact disc (CD) or digital video disc (DVD) drive 1206 coupled to the processor 1201. The computing device 1200 may also include network access ports 1204 (or interfaces) coupled to the processor 1201 for establishing data connections with a network, such as the Internet and/or a local area network coupled to other system computers and servers.

The computing device 1200 may include one or more antennas 1207 for sending and receiving electromagnetic radiation that may be connected to a wireless communication link. The computing device 1200 may include additional access ports, such as USB, Firewire, Thunderbolt, and the like for coupling to peripherals, external memory, or other devices.

Figure 13:
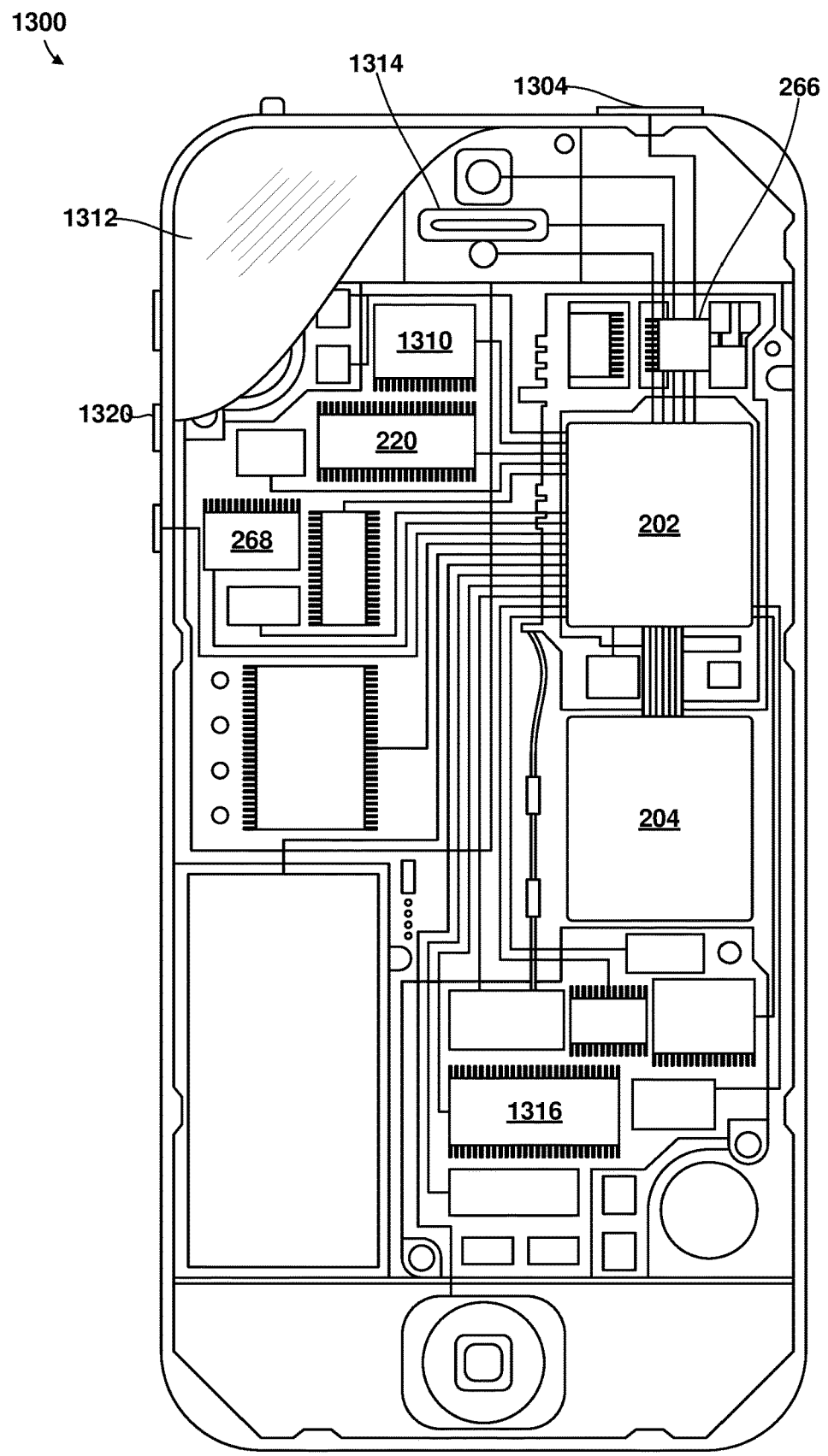
FIG. 13 is a component block diagram illustrating an example wireless communication device suitable for use with the various embodiments.

FIG. 13 is a component block diagram of a computing device 1300 suitable for use with various embodiments. With reference to FIGS. 1-10, various embodiments may be implemented on a variety of computing devices 1300 (e.g., computing device 100, 200), an example of which is illustrated in FIG. 13 in the form of a smartphone. The computing device 1300 may include a first SoC 202 (e.g., a SoC-CPU) coupled to a second SoC 204 (e.g., a 5G capable SoC). The first and second SoCs 202, 204 may be coupled to internal memory 1316, a display 1312, and to a speaker 1314. The first and second SoCs 202, 204 may also be coupled to at least one SIM 268 and/or a SIM interface that may store information supporting a first 5GNR subscription and a second 5GNR subscription, which support service on a 5G non-standalone (NSA) network.

The computing device 1300 may include an antenna 1304 for sending and receiving electromagnetic radiation that may be connected to a wireless transceiver 266 coupled to one or more processors in the first and/or second SoCs 202, 204. The computing device 1300 may also include menu selection buttons or rocker switches 1320 for receiving user inputs.

The computing device 1300 also includes a sound encoding/decoding (CODEC) circuit 1310, which digitizes sound received from a microphone into data packets suitable for wireless transmission and decodes received sound data packets to generate analog signals that are provided to the speaker to generate sound. Also, one or more of the processors in the first and second SoCs 202, 204, wireless transceiver 266 and CODEC 1310 may include a digital signal processor (DSP) circuit (not shown separately).

The processors of the computer 1100, the computing device 1200, and the computing device 1300 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SoC 204 dedicated to wireless communication functions and one processor within an SoC 202 dedicated to running other applications. Software applications may be stored in memory 220, 1112, 1113, 1202, 1203, 1316 before they are accessed and loaded into the processor. The processors may include internal memory sufficient to store the application software instructions.

Implementation examples are described in the following paragraphs. While some of the following implementation examples are described in terms of example methods that may be performed in a computing device by a UFS device, further example implementations may include: a computing device including a UFS device controller configured to perform the methods of the following implementation examples; a computing device including means for performing functions of the following implementation examples, a UFS device controller suitable for use in a computing device, in which the UFS device controller includes a processor configured to perform the methods of the following implementation examples; and a non-transitory, processor-readable memory having stored thereon processor-executable instructions configured to cause a UFS device controller in a computing device to perform the methods of the following implementation examples.

Example 1. A method performed by a universal flash storage (UFS) device of a computing device for configuring flash memory cells, may include: setting a number of degraded triple-level cells (TLCs) attribute; and configuring at least one degraded triple-level cell (TLC) as at least one single-level cell (SLC) based on the number of degraded TLCs attribute, the at least one degraded TLC being not functional as a TLC and functional as an SLC.

Example 2. The method of example 1, may further include: identifying the at least one degraded TLC based on at least one degradation attribute associated with the at least one degraded TLC, the at least one degradation attribute configured to indicate to the UFS device that the at least one degraded TLC is not functional as a TLC; and identifying an amount of degraded TLCs that are not functional as a TLC, in which setting the number of degraded TLCs attribute may include setting the number of degraded TLCs attribute based on the amount of degraded TLCs.

Example 3. The method of either of examples 1 or 2, in which configuring the at least one degraded TLC as the at least one SLC based on the number of degraded TLCs attribute may include configuring a plurality of degraded TLCs, including the at least one degraded TLC, up to a value of the number of degraded TLCs attribute as single-level cells (SLCs), including the at least one SLC, each of the plurality of degraded TLCs being not functional as a TLC and functional as an SLC.

Example 4. The method of either of examples 1 or 2, in which configuring the at least one degraded TLC as the at least one SLC based on the number of degraded TLCs attribute may include configuring a plurality of degraded TLCs, including the at least one degraded TLC, as SLCs, including the at least one SLC, each of the plurality of degraded TLCs being not functional as a TLC and functional as an SLC, the method may further include configuring a plurality of SLCs, equal in number to the plurality of degraded TLCs, as TLCs.

Example 5. The method of either of examples 1 or 2, in which configuring the at least one degraded TLC as the at least one SLC based on the number of degraded TLCs attribute may include configuring a plurality of degraded TLCs, including the at least one degraded TLC, as SLCs, including the at least one SLC, the plurality of degraded TLCs being equal in number to a plurality of degraded SLCs, each of the plurality of degraded TLCs being not functional as a TLC and functional as an SLC, and each of the plurality of degraded SLCs being not functional.

Example 6. The method of any of examples 1-5, in which the at least one SLC is part of a writebooster buffer, the method may further include assigning the writebooster buffer to a logical unit having a degradation value less than a logical unit degradation threshold.

Example 7. The method of any of examples 1-5, in which the at least one SLC is part of a writebooster buffer, the method may further include assigning the writebooster buffer having at least one degraded flash memory cell configured as a single-level cell to at least one undegraded logical unit, in which the degraded flash memory cell is identified as degraded based on the number of degraded TLCs attribute, the degraded flash memory cell being not functional as a TLC and functional as an SLC, and the undegraded logical unit having a degradation value less than a logical unit degradation threshold.

Example 8. The method of examples 1-7, may further include: providing the number of degraded TLCs attribute from a UFS controller to a host controller; and receiving an instruction to configure degraded TLCs as SLCs from the host controller at the UFS controller.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (TCUASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a universal flash storage (UFS) device of a computing device for configuring flash memory cells, comprising:
    setting a number of degraded triple-level cells (TLCs) attribute; and
    configuring at least one degraded triple-level cell (TLC) as at least one single-level cell (SLC) based on the number of degraded TLCs attribute, the at least one degraded TLC being not functional as a TLC and functional as an SLC.

2. The method of claim 1, further comprising:
    identifying the at least one degraded TLC based on at least one degradation attribute associated with the at least one degraded TLC, the at least one degradation attribute configured to indicate to the UFS device that the at least one degraded TLC is not functional as a TLC; and
    identifying an amount of degraded TLCs that are not functional as a TLC, wherein setting the number of degraded TLCs attribute comprises setting the number of degraded TLCs attribute based on the amount of degraded TLCs.

3. The method of claim 1, wherein configuring the at least one degraded TLC as the at least one SLC based on the number of degraded TLCs attribute comprises configuring a plurality of degraded TLCs, including the at least one degraded TLC, up to a value of the number of degraded TLCs attribute as single-level cells (SLCs), including the at least one SLC, each of the plurality of degraded TLCs being not functional as a TLC and functional as an SLC.

4. The method of claim 1, wherein configuring the at least one degraded TLC as the at least one SLC based on the number of degraded TLCs attribute comprises configuring a plurality of degraded TLCs, including the at least one degraded TLC, as SLCs, including the at least one SLC, each of the plurality of degraded TLCs being not functional as a TLC and functional as an SLC,
    the method further comprising configuring a plurality of SLCs equal in number to the plurality of degraded TLCs, as TLCs.

5. The method of claim 1, wherein configuring the at least one degraded TLC as the at least one SLC based on the number of degraded TLCs attribute comprises configuring a plurality of degraded TLCs, including the at least one degraded TLC, as SLCs, including the at least one SLC, the plurality of degraded TLCs being equal in number to a plurality of degraded SLCs, each of the plurality of degraded TLCs being not functional as a TLC and functional as an SLC, and each of the plurality of degraded SLCs being not functional.

6. The method of claim 1, wherein the at least one SLC is part of a writebooster buffer, the method further comprising assigning the writebooster buffer to a logical unit having a degradation value less than a logical unit degradation threshold.

7. The method of claim 1, wherein the at least one SLC is part of a writebooster buffer, the method further comprising assigning the writebooster buffer having at least one degraded flash memory cell configured as a single-level cell to at least one undegraded logical unit, wherein the degraded flash memory cell is identified as degraded based on the number of degraded TLCs attribute, the degraded flash memory cell being not functional as a TLC and functional as an SLC, and the undegraded logical unit having a degradation value less than a logical unit degradation threshold.

8. The method of claim 1, further comprising:
    providing the number of degraded TLCs attribute from a UFS controller to a host controller; and
    receiving an instruction to configure degraded TLCs as SLCs from the host controller at the UFS controller.

9. A universal flash storage (UFS) device of a computing device, comprising a UFS device controller configured to:
    set a number of degraded triple-level cells (TLCs) attribute; and
    configure at least one degraded triple-level cell (TLC) as at least one single-level cell (SLC) based on the number of degraded TLCs attribute, the at least one degraded TLC being not functional as a TLC and functional as an SLC.

10. The UFS device of claim 9, wherein the UFS device controller is further configured to:
    identifying the at least one degraded TLC based on at least one degradation attribute associated with the at least one degraded TLC, the at least one degradation attribute configured to indicate to the UFS device that the at least one degraded TLC is not functional as a TLC;
    identifying an amount of degraded TLCs that are not functional as a TLC; and
    setting the number of degraded TLCs attribute based on the amount of degraded TLCs.

11. The UFS device of claim 9, wherein the UFS device controller is further configured to configure a plurality of degraded TLCs, including the at least one degraded TLC, up to a value of the number of degraded TLCs attribute as single-level cells (SLCs), including the at least one SLC, each of the plurality of degraded TLCs being not functional as a TLC and functional as an SLC.

12. The UFS device of claim 9, wherein the UFS device controller is further configured to:
configure a plurality of degraded TLCs, including the at least one degraded TLC, as SLCs, including the at least one SLC, each of the plurality of degraded TLCs being not functional as a TLC and functional as an SLC; and
configure a plurality of SLCs equal in number to the plurality of degraded TLCs, as TLCs.

13. The UFS device of claim 9, wherein the UFS device controller is further configured to configure a plurality of degraded TLCs, including the at least one degraded TLC, as SLCs, including the at least one SLC, the plurality of degraded TLCs being equal in number to a plurality of degraded SLCs, each of the plurality of degraded TLCs being not functional as a TLC and functional as an SLC, and each of the plurality of degraded SLCs being not functional.

14. The UFS device of claim 9, wherein the at least one SLC is part of a writebooster buffer, and the UFS device controller is further configured to assign the writebooster buffer to a logical unit having a degradation value less than a logical unit degradation threshold.

15. The UFS device of claim 9, wherein the at least one SLC is part of a writebooster buffer, the UFS device controller is further configured to assign the writebooster buffer having at least one degraded flash memory cell configured as a single-level cell to at least one undegraded logical unit, wherein the degraded flash memory cell is identified as degraded based on the number of degraded TLCs attribute, the degraded flash memory cell being not functional as a TLC and functional as an SLC, and the undegraded logical unit having a degradation value less than a logical unit degradation threshold.

16. The UFS device of claim 9, wherein the UFS device controller is further configured to:
provide the number of degraded TLCs attribute to a host controller; and
receive an instruction to configure degraded TLCs as SLCs from the host controller.

17. A universal flash storage (UFS) device of a computing device, comprising:
means for setting a number of degraded triple-level cells (TLCs) attribute; and
means for configuring at least one degraded triple-level cell (TLC) as at least one single-level cell (SLC) based on the number of degraded TLCs attribute, the at least one degraded TLC being not functional as a TLC and functional as an SLC.

18. The UFS device of claim 17, wherein means for configuring the at least one degraded TLC as the at least one SLC based on the number of degraded TLCs attribute comprises means for configuring a plurality of degraded TLCs, including the at least one degraded TLC, up to a value of the number of degraded TLCs attribute as single-level cells (SLCs), including the at least one SLC, each of the plurality of degraded TLCs being not functional as a TLC and functional as an SLC.

19. The UFS device of claim 17, wherein means for configuring the at least one degraded TLC as the at least one SLC based on the number of degraded TLCs attribute comprises means for configuring a plurality of degraded TLCs, including the at least one degraded TLC, as SLCs, including the at least one SLC, each of the plurality of degraded TLCs being not functional as a TLC and functional as an SLC,
the UFS device further comprising means for configuring a plurality of SLCs, equal in number to the plurality of degraded TLCs, as TLCs.

20. The UFS device of claim 17, wherein means for configuring the at least one degraded TLC as the at least one SLC based on the number of degraded TLCs attribute comprises means for configuring a plurality of degraded TLCs, including the at least one degraded TLC, as SLCs, including the at least one SLC, the plurality of degraded TLCs being equal in number to a plurality of degraded SLCs, each of the plurality of degraded TLCs being not functional as a TLC and functional as an SLC, and each of the plurality of degraded SLCs being not functional.

* * * * *